United States Patent
Floyd et al.

(10) Patent No.: US 11,593,889 B2
(45) Date of Patent: Feb. 28, 2023

(54) SYSTEMS AND METHODS FOR MAINTAINING A DISTRIBUTED LEDGER PERTAINING TO AUTONOMOUS VEHICLES

(71) Applicant: STATE FARM MUTUAL AUTOMOBILE INSURANCE COMPANY, Bloomington, IL (US)

(72) Inventors: Matthew L. Floyd, Alpharetta, GA (US); Alvin Hon-Wai Yu, Johns Creek, GA (US); Antwuan Murphy, Riverdale, GA (US); Brittney Benzio, Atlanta, GA (US); Lindsi Brantley, Atlanta, GA (US); Matthew S. Delaney, Alpharetta, GA (US); Matthew Vulich, Marietta, GA (US); Matthew S. Rodriguez, Dunwoody, GA (US); Neha Goel, Atlanta, GA (US); Sabrina Collins, Woodstock, GA (US); Annie Pudlo Murillo, Roswell, GA (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

(21) Appl. No.: 17/082,860

(22) Filed: Oct. 28, 2020

(65) Prior Publication Data

US 2021/0118060 A1 Apr. 22, 2021

Related U.S. Application Data

(63) Continuation of application No. 15/624,341, filed on Jun. 15, 2017, now abandoned.
(Continued)

(51) Int. Cl.
*G06Q 40/00* (2012.01)
*G06Q 40/08* (2012.01)
(Continued)

(52) U.S. Cl.
CPC ............ *G06Q 40/08* (2013.01); *G05D 1/0214* (2013.01); *G06Q 50/26* (2013.01); *G07C 5/008* (2013.01);
(Continued)

(58) Field of Classification Search
CPC ............ G07C 5/008; G06Q 40/08; B60Q 9/00
See application file for complete search history.

(56) References Cited

U.S. PATENT DOCUMENTS 8,140,358 B1 * 3/2012 Ling ................. G07C 5/008
340/439
9,311,271 B2 4/2016 Wright
(Continued)

FOREIGN PATENT DOCUMENTS

WO 2021/046494 A1 3/2021

OTHER PUBLICATIONS

Borgia, Eleonora (The Internet of Things vision: Key features, applications and open issues, Computer Communications, https://www.sciencedirect.com/science/article/pii/S0140366414003168, Oct. 14, 2014) (Year: 2014).*
(Continued)

*Primary Examiner* — Mike Anderson
*Assistant Examiner* — Mark H Gaw
(74) *Attorney, Agent, or Firm* — Marshall, Gerstein & Borun LLP

(57) ABSTRACT

Methods and systems for maintaining a distributed ledger and/or blockchain of transactions and/or events pertaining to autonomous vehicles and/or smart contracts. An enforcement server may receive indications of transactions and/or
(Continued)

events generated by one or more autonomous vehicles. The transactions and/or events may include information relating to a trigger condition and/or a decision condition associated with one or more smart contracts. The enforcement server may route the transaction to the appropriate smart contract to determine whether a trigger condition has been satisfied. When a trigger condition is satisfied, the enforcement server may automatically perform an action to enforce the smart contract and/or update the distributed ledger. In some aspects, the distributed ledger may record events associated with autonomous and semi-autonomous vehicle technology or system usage, including events associated with transitioning between manual and autonomous control, or vice versa, of one or more autonomous or semi-autonomous vehicles.

18 Claims, 8 Drawing Sheets

Related U.S. Application Data

(60) Provisional application No. 62/457,430, filed on Feb. 10, 2017, provisional application No. 62/434,215, filed on Dec. 14, 2016, provisional application No. 62/428,223, filed on Nov. 30, 2016, provisional application No. 62/425,684, filed on Nov. 23, 2016.

(51) Int. Cl.
| | |
|---|---|
| *G07C 5/00* | (2006.01) |
| *G07C 5/02* | (2006.01) |
| *G05D 1/02* | (2020.01) |
| *G06Q 50/26* | (2012.01) |
| *H04L 9/06* | (2006.01) |
| *G05D 1/00* | (2006.01) |

(52) U.S. Cl.
CPC .............. *G07C 5/02* (2013.01); *H04L 9/0637* (2013.01); *G05D 1/0088* (2013.01); *G05D 2201/0212* (2013.01)

(56) References Cited

U.S. PATENT DOCUMENTS

| | | | |
|---|---|---|---|
| 9,390,451 B1 | 7/2016 | Slusar | |
| 9,587,952 B1* | 3/2017 | Slusar | ................ G01C 21/362 |
| 9,633,487 B2 | 4/2017 | Wright | |
| 9,805,423 B1* | 10/2017 | Konrardy | ........... G08G 1/09675 |
| 9,905,133 B1 | 2/2018 | Kumar et al. | |
| 9,940,676 B1 | 4/2018 | Biemer | |
| 10,192,369 B2 | 1/2019 | Wright | |
| 10,198,879 B2 | 2/2019 | Wright | |
| 10,454,878 B2 | 10/2019 | Khan et al. | |
| 10,521,780 B1 | 12/2019 | Hopkins, III et al. | |
| 10,586,062 B1 | 3/2020 | Hopkins et al. | |
| 10,606,669 B2 | 3/2020 | Jacobs et al. | |
| 10,796,371 B1 | 10/2020 | Floyd et al. | |
| 10,796,393 B2 | 10/2020 | Messerges et al. | |
| 10,805,085 B1 | 10/2020 | Liang | |
| 10,833,843 B1 | 11/2020 | Vijayvergia et al. | |
| 10,872,381 B1 | 12/2020 | Leise et al. | |
| 10,878,512 B1 | 12/2020 | Al-Zoubi et al. | |
| 10,891,694 B1 | 1/2021 | Leise et al. | |
| 2002/0035422 A1 | 3/2002 | Sasaki | |
| 2008/0033684 A1 | 2/2008 | Vian et al. | |
| 2008/0161987 A1* | 7/2008 | Breed | ................... G08G 1/161 701/27 |
| 2010/0131304 A1 | 5/2010 | Collopy et al. | |
| 2015/0170287 A1 | 6/2015 | Tirone et al. | |
| 2015/0346718 A1* | 12/2015 | Stenneth | ............. G05D 1/0282 701/2 |
| 2016/0028552 A1* | 1/2016 | Spanos | ................. H04L 9/3268 713/178 |
| 2016/0117471 A1 | 4/2016 | Belt et al. | |
| 2016/0167652 A1 | 6/2016 | Slusar | |
| 2016/0171521 A1 | 6/2016 | Ramirez et al. | |
| 2016/0203560 A1 | 7/2016 | Parameshwaran | |
| 2017/0046652 A1* | 2/2017 | Haldenby | ........... G06Q 20/401 |
| 2017/0053460 A1 | 2/2017 | Hauser et al. | |
| 2017/0225567 A1* | 8/2017 | Tsuda | ................... B60W 40/04 |
| 2017/0331896 A1 | 11/2017 | Holloway et al. | |
| 2018/0018723 A1 | 1/2018 | Nagla et al. | |
| 2018/0046992 A1 | 2/2018 | Hanrahan et al. | |
| 2018/0122237 A1 | 5/2018 | Nascimento et al. | |
| 2018/0127001 A1 | 5/2018 | Ricci | |
| 2018/0218455 A1 | 8/2018 | Kolb et al. | |
| 2019/0019186 A1 | 1/2019 | Falah et al. | |
| 2019/0197620 A1 | 6/2019 | Jayaram et al. | |
| 2019/0354966 A1 | 11/2019 | Himura et al. | |
| 2019/0392437 A1 | 12/2019 | Castagna et al. | |
| 2019/0392438 A1 | 12/2019 | Rice | |
| 2020/0058071 A1 | 2/2020 | Yang | |
| 2020/0065763 A1 | 2/2020 | Rosinzonsky et al. | |
| 2020/0177373 A1 | 6/2020 | Komandur et al. | |
| 2020/0226677 A1 | 7/2020 | Dhawan et al. | |
| 2020/0250753 A1 | 8/2020 | Blount | |
| 2020/0272966 A1 | 8/2020 | Kirkegaard | |
| 2020/0279328 A1 | 9/2020 | Zhiri et al. | |
| 2020/0341971 A1 | 10/2020 | Krishnaswamy et al. | |
| 2020/0394321 A1 | 12/2020 | Ramos et al. | |
| 2020/0394322 A1 | 12/2020 | Ramos et al. | |
| 2020/0409937 A1 | 12/2020 | Wang et al. | |
| 2021/0065293 A1 | 3/2021 | Sigler et al. | |
| 2021/0090037 A1 | 3/2021 | Dowding | |
| 2021/0174442 A1 | 6/2021 | Trudeau et al. | |

OTHER PUBLICATIONS

Crawford et al., Blockchain technology as a platform for digitization, EYG No. EG0323, 16 pages (2016).

Dennis et al., A Temporal Blockchain: A Formal Analysis, 2016 International Conference on Collaboration Technologies and Systems (CTS), 430-437 (2016).

Nakamoto Satoshi, Bitcoin: A Peer-to-Peer Electronic Cash System, Bitcoin.org, 9 pages (2008).

Powell et al., Consumer choice in auto repair: The politics and economics of automobile insurance repair practices, National Association of Mutual Insurance companies, web, 2-24 (2010).

Wikipedia, Blockchain, available online at <https://en.wikipedia.org/w/index.php?title= Blockchain&oldid=687975661>, (Oct. 28, 2015).

Wikipedia, Smart Contract, available online at <https://en.wikipedia.org/w/index.php?title=Smart_contract&oldid=683295620>, (Sep. 29, 2015).

Yuan et al., Towards Blockchain-based Intelligent Transportation Systems, 2016 IEEE 19th International Conference on Intelligent Transportation Systems (ITSC 2016), 2663-2668 (2016).

\* cited by examiner

SYSTEMS AND METHODS FOR MAINTAINING A DISTRIBUTED LEDGER PERTAINING TO AUTONOMOUS VEHICLES

CROSS-REFERENCE TO RELATED APPLICATIONS

This application is a continuation of U.S. patent application Ser. No. 15/624,341 entitled "SYSTEMS AND METHODS FOR MAINTAINING A DISTRIBUTED LEDGER PERTAINING TO AUTONOMOUS VEHICLES," filed on Jun. 15, 2017, which claims priority to and the benefit of the filing date of (1) provisional U.S. Patent Application No. 62/425,684 entitled "SYSTEMS AND METHODS FOR MAINTAINING A DISTRIBUTED LEDGER GOVERNING AUTONOMOUS VEHICLE TRANSACTIONS," filed on Nov. 23, 2016, (2) provisional U.S. Patent Application No. 62/428,223 entitled "SYSTEMS AND METHODS FOR MAINTAINING A DISTRIBUTED LEDGER GOVERNING AUTONOMOUS VEHICLE TRANSACTIONS," filed on Nov. 30, 2016; (3) provisional U.S. Patent Application No. 62/434,215 entitled "SYSTEMS AND METHODS FOR MAINTAINING A DISTRIBUTED LEDGER GOVERNING AUTONOMOUS VEHICLE TRANSACTIONS," filed on Nov. 30, 2016; and (4) provisional U.S. Patent Application No. 62/457,430 entitled "SYSTEMS AND METHODS FOR MAINTAINING A DISTRIBUTED LEDGER GOVERNING AUTONOMOUS VEHICLE TRANSACTIONS," filed on Feb. 10, 2017; the entire contents of each of which are hereby expressly incorporated herein by reference.

FIELD OF THE DISCLOSURE

The present disclosure generally relates to the maintenance of a distributed ledger that governs autonomous vehicle transactions and, more particularly, to systems and methods that leverage the distributed ledger to facilitate the enforcement of a one or more smart contracts associated with a one or more of autonomous vehicles.

BACKGROUND

In an autonomous vehicle, control of the vehicle may shift between varying states of manual and autonomous control. According to SAE International, there are six levels of automation for on-road vehicles ranging from no automation at all (level 0) to full automation of all aspects of dynamic driving (level 5). Depending on which vehicle systems are operating under autonomous control liability for any damage that occurs to the autonomous vehicle (or by the autonomous vehicle) may vary between an operator of the autonomous vehicle, an insurer of the operator and/or autonomous vehicle, and/or a manufacturer of the autonomous vehicle. Similarly, vehicle autonomy may also lead to other shifts in traditional liability arrangements. However, currently there is no trusted system that automatically enforces these liability arrangements associated with autonomous vehicles.

SUMMARY

The present embodiments may be related to autonomous vehicle operation, including smart contracts that govern the operation of the autonomous vehicles. The embodiments described herein relate particularly to various aspects of autonomous operation, feature, component and/or sensor monitoring, and/or assessment. When data relevant to a smart contract is generated, a transaction may be generated and compiled into a block of a distributed ledger. Alternatively, some aspects relate to enforcement of smart contracts which are automatically enforced based at least upon the transactions included in the distributed ledger. Specific systems and methods are summarized below. The methods and systems summarized below may include additional, less, or alternate actions, including those discussed elsewhere herein.

In one aspect, a computer-implemented method for maintaining a distributed ledger or blockchain of transactions or events pertaining to autonomous vehicles may be provided. The method may include (1) receiving, at one or more processors, one or more autonomous vehicle-related transactions and/or events from one or more autonomous vehicles, the transactions indicative of at least one of a trigger condition; (2) compiling, by the one or more processors, the one or more autonomous vehicle-related transactions or events into a block of transactions or events; (3) distributing, by the one or more processors, the block of autonomous vehicle-related transactions or events to a plurality of validation entities or nodes within a communication network to form a consensus on whether or not to update the distributed ledger; and/or (4) when a consensus is formed, updating, by the one or more processors, the distributed ledger at the plurality of validation entities or nodes to facilitate maintaining a distributed ledger or blockchain associated with autonomous vehicle-related transactions or events up-to-date. The method may include additional, less, or alternate actions, including those discussed elsewhere herein.

For instance, the method may include routing, by the one or more processors, the plurality of transactions or events within the block to a plurality of smart contracts. A particular transaction or event corresponding to a particular smart contract may indicate that a trigger condition for the particular smart contract has occurred. Additionally or alternatively, receiving the plurality of transactions may include receiving, at the one or more processors, the plurality of transactions and/or events via a mesh network formed of multiple autonomous vehicles. The method may also include automatically executing, by the one or more processors, an action the particular smart contract directs should be performed in response to the particular trigger condition. The action may be determined based upon a decision condition included in a transaction or event routed to the particular smart contract.

In some embodiments, the trigger condition for the particular smart contract may be a particular autonomous vehicle incurring liability or being involved in a vehicle collision; and/or the particular transaction or event may indicate that the particular autonomous vehicle incurred liability or was involved in a vehicle collision. Additionally or alternatively, the decision condition for the particular smart contract may be a control state of the particular autonomous vehicle; and the particular transaction or event may indicate whether the particular autonomous vehicle was being autonomously or manually operated. In these embodiments, automatically executing the action may include assigning, by the one or more processors, the liability to (i) an insurer associated with an operator of the particular autonomous vehicle when the particular transaction or event indicates the particular autonomous vehicle was being manually operated, or (ii) a manufacturer of the particular autonomous vehicle when the particular transaction or event indicates the particular autonomous vehicle was being autonomously operated. Additionally or alternatively, automatically executing the action may include transmitting, by the one or more processors, at least one of a tow request to a towing service, a police report to a law enforcement entity, and/or a subrogation request to an insurer of another autonomous vehicle.

In some further embodiments, the decision condition for the particular smart contract may be a distance traversed by the particular autonomous vehicle; and the particular transaction may indicate the distance that the particular autonomous vehicle has traversed during a trip. In these embodiments, automatically executing the action may include assigning, by the one or more processors, liability to (i) an operator of the particular autonomous vehicle when the distance traversed by the particular autonomous vehicle exceeds a maximum trip length indicated in the particular smart contract, or (ii) an insurer associated with the operator of the particular autonomous vehicle when the distance traversed by the particular autonomous vehicle does not exceed the maximum trip length indicated in the particular smart contract.

In some embodiments, distributing the block to the plurality of validation entities may include distributing, by the one or more processors, the block to a portion of the plurality of autonomous vehicles. Additionally or alternatively, the autonomous vehicle-related transactions or events recorded may be related to at least one of the following autonomous vehicle systems, features, or technologies: (a) driver alertness monitoring; (b) driver responsiveness monitoring; (c) pedestrian detection; (d) artificial intelligence; (e) a back-up system; (f) a navigation system; (g) a positioning system; (h) a security system; (i) an anti-hacking measure; (j) a theft prevention system; and/or (k) remote vehicle location determination.

Systems or computer-readable media storing instructions for implementing all or part of the method described above may also be provided in some aspects. Systems for implementing such methods may include one or more of the following: a special-purpose computing device, a personal electronic device, a processing unit of a vehicle, a remote server, one or more sensors, one or more communication modules configured to communicate wirelessly via radio links, radio frequency links, and/or wireless communication channels, and/or one or more program memories coupled to one or more processors of the personal electronic device, processing unit of the vehicle, or remote server. Such program memories may store instructions to cause the one or more processors to implement part or all of the method described above. Additional or alternative features described herein below may be included in some aspects.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1A:
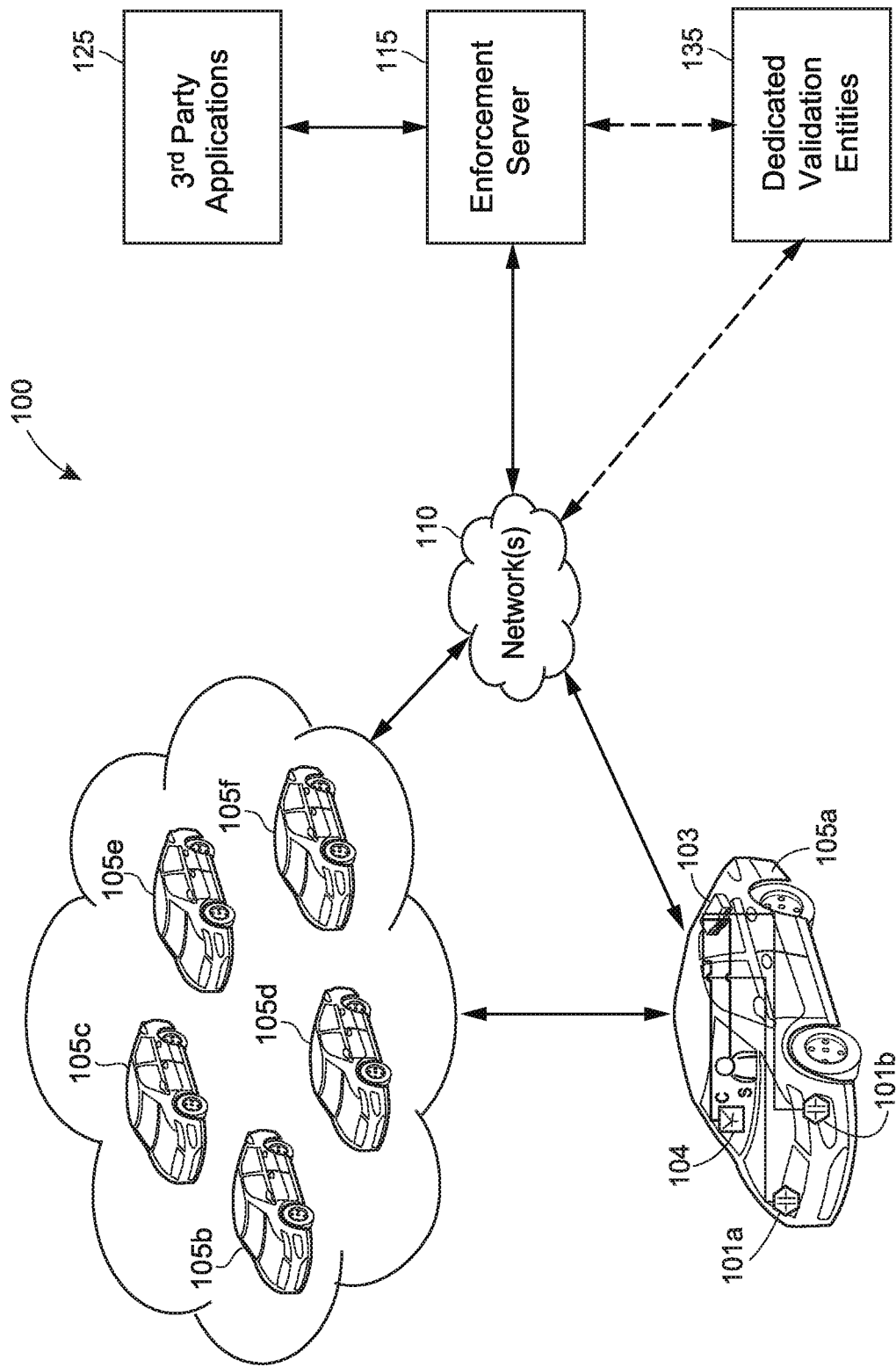
FIG. 1A depicts an exemplary environment including components and entities associated with maintaining a distributed ledger to facilitate the enforcement of a plurality smart contracts associated with autonomous vehicles, in accordance with some embodiments.

The present embodiments may relate to, inter alia, maintaining a distributed ledger to enforce a plurality of smart contracts associated with a plurality of autonomous vehicles. In some aspects, the present embodiments relate to autonomous vehicle operation monitoring and/or assessment. The operation of the autonomous vehicles may impact the obligations of various parties associated with the autonomous vehicle, for example, an operator of the autonomous vehicle, a manufacturer of the autonomous vehicle, an insurer of the operator, an insurer of the autonomous vehicle, and/or other parties. To this end, the present embodiments may leverage the use of a distributed ledger and/or smart contracts to codify and/or automatically enforce these obligations.

A distributed ledger is a transactional record that is maintained at each node of a peer to peer network. Commonly, the distributed ledger is comprised of groupings of transactions bundled together into a "block." When a change to the distributed ledger is made (e.g., when a new transaction and/or block is created), each node must form a consensus as to how the change is integrated into the distributed ledger. Upon consensus, the agreed upon change is pushed out to each node so that each node maintains an identical copy of the updated distributed ledger. Any change that does not achieve a consensus is ignored. Accordingly, unlike a traditional, centralized ledger, a single party cannot unilaterally alter the distributed ledger.

In an application of distributed ledgers, each new block may be cryptographically linked to the previous block in order to form a "blockchain." More particularly, to create a new block, each transaction within a block may be assigned a hash value (i.e., an output of a cryptographic hash function, such as SHA-2 or MD5). These hash values may then be combined together utilizing cryptographic techniques (e.g., a Merkle Tree) to generate a hash value representative of the entire new block. This hash value may then be combined with the hash value of the previous block to form a hash value included in the header of the new block, thereby cryptographically linking the new block to the blockchain.

To this end, the precise value utilized in the header of the new block is dependent on the hash value for each transaction in the new block, as well as the hash value for each transaction in every prior block.

According to aspects, the hash value generated for the new block may be used as an input to a cryptographic puzzle that manipulates a nonce value. When a solution to the cryptographic puzzle is found, the solving node publishes the solution and the other nodes then verify that the solution is the correct solution. Because the solution also depends on the particular hash values for each transaction within the blockchain, if the solving node attempted to modify any transaction, the solution would not be verified by the other nodes. More particularly, if a single node attempts to modify a prior transaction within the blockchain, a cascade of different hash values are generated for each tier of the cryptographic combination technique. This results in the header for one or more blocks being different than the corresponding header(s) in every other node that did not make the exact same modification. As a result, the solution generated by the modifying node would not solve the cryptographic puzzle presented to any node without the identical modification. Thus, the version of the new block generated by the modifying node is readily recognized as including an improper modification and is rejected by the consensus. This inability to modify past transactions lead to blockchains being generally described as trusted, secure, and/or immutable.

A smart contract is a computer protocol that enables the automatic execution and/or enforcement of an agreement between different parties. The smart contract may include one or more trigger conditions, that, when satisfied, correspond to one or more actions. For some smart contracts, which action(s) from the one or more actions are performed is determined based upon one or more decision conditions. An enforcement entity corresponding to the smart contract may subscribe to one or more data streams including data related to a trigger condition and/or a decision condition. Accordingly, the enforcement entity may route the data streams to the smart contract so that the smart contract may detect that a trigger condition has occurred and/or analyze a decision condition to direct the enforcement entity to perform one or more actions.

As an example, a pay-per-trip insurer may include a maximum distance the autonomous vehicle may traverse in each trip. In this example, a driver and the pay-per-trip insurer may generate a smart contract to insure a particular trip. In response, the enforcement entity may receive an odometer data stream from the covered vehicle. If the autonomous vehicle incurs liability during the trip (e.g., a trigger event occurred), the smart contract may automatically analyze the odometer data feed to determine whether the autonomous vehicle was operated within the bounds of the maximum distance in the insurance agreement (e.g., a decision condition). Accordingly, the smart contract may direct the performance of an action to automatically assign liability to an operator or the insurer based upon the odometer data feed. In another example, an insurer of an autonomous vehicle and a manufacturer of an autonomous vehicle may generate a smart contract to divide the liability for damage to and/or caused by the autonomous vehicle. In particular, the insurer may agree to cover liability incurred during manual operation and the manufacturer may agree to cover liability incurred during autonomous operation. The enforcement entity for this smart contract may subscribe to a data feed indicative of a control state of the autonomous car. Accordingly, in response to the autonomous vehicle incurring liability (e.g., a trigger event occurred), the smart contract may direct the performance of an action to generate a claim and assign it to the appropriate entity based upon the control state (e.g., a decision condition). Of course, sensors monitoring an autonomous vehicle may be leveraged to facilitate many other types of liability arrangements in a generated smart contract.

Given the relative ease to modify computer files, including a smart contract computer file, and the parties' competing incentives, there needs to be a system that all parties trust to fairly and accurately regulate and enforce the smart contract. For at least the above reasons, a distributed ledger and/or a blockchain system may be utilized to establish such a trusted system. To this end, the distributed ledger may be leveraged to record the smart contract and/or the data related to the trigger conditions and/or decision conditions of the smart contract. More particularly, the data utilized to determine the presence of a trigger condition and/or to analyze decision conditions to determine an action may be recorded within a transaction included in the distributed ledger. By recording this data in the distributed ledger, there is a public and trusted record of the smart contract and the reasoning behind any action performed as directed by the smart contract. As a result, the parties that generated the smart contract may automatically enforce their contracts in a transparent and objective manner. For at least this reason, an entity the regularly generates smart contracts, such as an insurer, may establish a distributed ledger to govern and enforce a plurality of its smart contracts. According to certain aspects, the distributed ledger may either be a public ledger (each node may readily view the underlying data of each transaction) or a private ledger (the underlying data needs an encryption key to be viewed), or a combination of public and private ledger aspects.

According to certain aspects, an electronic device associated with each vehicle may execute an application to monitor operational autonomous vehicle data that is relevant to the enforcement of a smart contract. The application may interpret the operational data to generate a "transaction" or a time-stamped record of the relevant operational data. In one embodiment, the transaction may include an identification of the autonomous vehicle or operator, a time of the transaction, and an indication of one or more vehicle conditions relevant to a smart contract. In one embodiment, the application may process the operational data to create the indication of the vehicle condition. For example, the application may process an airbag activation event to determine that the autonomous vehicle was involved in a collision. As a result, the application may generate a transaction that indicates a liability-inducing event occurred. The transaction may further include data relating to one or more decision conditions that the smart contract analyzes to determine an action to perform in response to the trigger condition. As another example, the presence of microvibrations in a steering wheel may indicate a vehicle operator does not have his or her hands on the steering, such as is likely to occur in an autonomous operation mode. Accordingly, the application may monitor the presence of these microvibrations. In one scenario, when a transaction indicative of a trigger condition is generated, the transaction polls the microvibration sensor to determine a control state of the vehicle and generate an indication of the control state to include in the transaction. In another scenario, when the application detects that the microvibrations appear or disappear, the application may generate a transaction indicative of a shift to autonomous or manual operation, respectively.

In one aspect, the application may receive an indication from an enforcement entity that the enforcement entity is subscribing to a data stream associated with the autonomous vehicle. For example, when a new smart contract is generated, the enforcement entity may subscribe to one or more data streams related to a trigger condition and/or decision condition associated therewith. Accordingly, in response to the subscription request, the application may monitor one or more sensors relevant to trigger conditions and/or the decision conditions associated with the smart contract. It should be appreciated that the electronic device may monitor these sensors for other purposes (e.g., controlling the operation of the autonomous vehicle). Accordingly, as it used herein, "monitoring" may refer to the act of monitoring these sensors for the purpose of enforcing a smart contract and/or generating a transaction that may be included in the distributed ledger. In some embodiments, after the enforcement and/or termination of the smart contract, the application may receive an indication that the enforcement entity is unsubscribing from a data streams associated with the autonomous vehicle. Accordingly, the application may cease monitoring the relevant sensors in response to the unsubscribe request.

According to certain aspects, not all events that incur liability have the same priority. For example, an autonomous vehicle that is involved in a "fender bender" may be a lower priority than an autonomous vehicle that was involved in a head-on collision. However, in some embodiments, the enforcement entity may not compile and analyze the block of transactions until a threshold time has elapsed. As a result, in an emergency situation, precious time may be wasted waiting for the block to be compiled. Accordingly, the application may include in each transaction a priority indication. When the application transmits to the enforcement entity a transaction with an urgent priority indication, the reception of the urgent transaction may trigger the enforcement entity to compile a new block that includes any pending transactions received after the prior compilation period. Consequently, the urgent transaction may be processed faster than possible in a traditional blockchain implementation. It should be appreciated that while the block size may generally vary based upon the number of transactions received, the aperiodic compilation of a block in response to an urgent transaction may cause a greater variation in the block size than a traditional blockchain.

In one aspect, the systems and methods discussed herein address a challenge that is particular to blockchains. As an example, the challenge relates to reducing the amount of data included in the blockchain to keep the size of the blockchain within a reasonable size. To this end, by the application processing the operational data of the autonomous vehicles to create state-based transactions instead of operational data-based transactions, fewer transactions are generated. Instead of a transaction being generated each sample period of an operating data, the transaction may only be generated in response to a change in state of a condition relevant to a smart contract. This may reduce the number of transactions generated at each autonomous vehicle, enabling the enforcement entity to compile blocks having a smaller, faster to process, block size. Moreover, because the blocks are transmitted to each validation entity, decreasing the block size may reduce network congestion enabling each block to be validated faster. As a result, the systems and methods are necessarily rooted in computer technology in order to overcome the aforementioned shortcomings that specifically arise in the realm of blockchain technology.

Moreover, in one aspect, the enforcement entity may further reduce the size of the blockchain by pruning old blocks and/or transactions. For example, when a driver purchases a smart contract insurance product for a single trip, if no collision occurs during that trip, there may be no need to maintain the transactions relating to the trip upon its conclusion. Similarly, even if a collision occurs, liability for any damage may be assigned and processed, negating the need to include the data in the block chain. Accordingly, the enforcement entity may analyze the blockchain for any transactions that may be pruned from the blockchain. However, as described above, simply removing the transaction from the distributed ledger may change one or more hash values within the block causing the pruned block to be rejected when consensus is sought. Accordingly, pruning may involve removing the underlying transaction data but maintaining the header and/or hash value of the transaction. Because the header and/or hash value generally requires less storage than the underlying data, pruning can reduce the block size of older blocks while still being able to form a consensus on a blockchain that includes the pruned block.

In another aspect, to further reduce the size of the blocks, the systems and methods disclosed may reduce duplicate and/or correlated transaction generated by one or more vehicles. To this end, when one or more autonomous vehicles collide with one another, the applications monitoring the operation of the respective autonomous vehicles may exchange operational data for a period of time leading up to the collision. Based upon the operational data respectively corresponding to each of the one or more vehicles, one of the applications may generate a single transaction that includes the condition of each of the one or more autonomous vehicles involved in the collision. In some embodiments, this transaction may include decision condition data indicating a relative fault for each of the one or more autonomous vehicles based upon the analysis of the respectively corresponding sets of operational data. Accordingly, the single transaction may be routed to a plurality of smart contracts associated with any one of the one or more autonomous vehicles involved in the collision.

Exemplary Environments for Maintaining Distributed Ledger

FIG. 1A depicts an exemplary environment 100 maintaining a distributed ledged for the enforcement of a plurality of smart contracts. Although FIG. 1 depicts certain entities, components, and devices, it should be appreciated that additional or alternate entities and components are envisioned.

As illustrated in FIG. 1A, the environment 100 may include a plurality of autonomous vehicles 105*a*-*f*. As it is generally used herein, the term "autonomous vehicle" refers to any vehicle with autonomous (or even semi-autonomous) capabilities. Thus, "autonomous vehicle" is not limited to fully autonomous vehicles (SAE level 5) and includes even partially automated vehicles (SAE level 2). It should be appreciated that in fully autonomous vehicles, an "operator" may include a person that provides navigational input to the autonomous vehicle and/or a person located within the vehicle at a location wherein the person is capable of engaging manual control should the need and/or desire arise. As illustrated on the autonomous vehicle 105*a*, the autonomous vehicle 105*a* may include one or more sensors 101*a*-*b* that monitor the operational status of the autonomous vehicle 105*a*. The sensors 101 may include, for example, a pressure sensor, a gyroscope, an accelerometer, an odometer, a vibration sensor, a microphone, an image sensor, a temperature sensor, and/or a radar or LIDAR sensor. Some of the sensors 101 may be included in the autonomous vehicle 105*a* by a manufacturer of the vehicle 105*a* and others of the sensors 101 may be retrofitted onto the vehicle 105a at some point after manufacture. For example, a fleet manager may retrofit the vehicle 105a with a particular type of sensor that relates to a smart contact frequently generated by the fleet manager.

The autonomous vehicle 105a may further include an electronic device 103 configured to interpret operational data generated by the sensors 101. Although FIG. 1A illustrates the electronic device 103 as a processing unit of the vehicle 105a interconnected to the sensors 101 via a communication bus of the vehicle 105a, in other embodiments the electronic device 103 may be a personal electronic device (e.g., a mobile phone, a tablet, a laptop computer, a smart watch, smart glasses, other types of wearable electronics, an on-board diagnostic monitor, and so on) associated with an operator of the vehicle 105a. In these embodiments, the personal electronic device may receive the operational data via a wireless interface (e.g., a Bluetooth interface, a Wi-Fi interface, or other known wireless communication interfaces) or a wired interface (e.g., an OBD port, a USB interface, an auxiliary interface, or other known wired communication interfaces). Additional information describing the operation of autonomous vehicles may be found in co-owned U.S. patent application Ser. NO. 14/713,249 entitled "AUTONOMOUS VEHICLE OPERATION FEATURE MONITORING AND EVALUATION OF EFFECTIVENESS," the entire disclosure of which is hereby incorporated by reference.

Regardless of the particular type of electronic device, the electronic device 103 may include an application configured to analyze the operational data generated by the sensors 101. More particularly, the application may be configured to analyze the operational data to detect a plurality of conditions (e.g., trigger conditions or decision conditions) associated with the vehicle 105a. Periodically and/or in response to a change in condition, the application may generate a transaction that incorporates one or more of the detected conditions. According to certain aspects, the transaction may include indications of the one or more conditions, an identifier of the vehicle 105a and/or the operator of the vehicle 105a, a timestamp, an indication of a priority, and/or a portion of the operational data upon which the one or more detected conditions may be based. The electronic device 103 may transmit generated transactions via an antenna 104. Although FIG. 1 illustrates the antenna 104 as being separate from the electronic device 103, it should be appreciated that for some types of electronic devices, such as a mobile phone, the antenna 104 may be included in the electronic device 103 itself.

According to certain aspects, the electronic device 103 may also be configured to receive control signals from a command center and/or other remote computing device (not depicted) to remotely control the operation of the vehicle 105a. In some scenarios, the control signals are indicative of a remote user actively controlling the vehicle 105a (e.g., the remote user is piloting the vehicle 105a as a drone operator would pilot a drone). In other scenarios, the control signals are indicative of particular actions the autonomous systems of the vehicle 105a should undertake. For example, an ambulance may broadcast a control signal to nearby autonomous vehicles to cause the autonomous vehicles to yield to the ambulance and/or pull over to the side of the road.

The plurality of autonomous vehicles 105a-f may be configured to communicate with an enforcement server 115 via one or more communication networks 110. The networks 110 may facilitate any data communication between the plurality of autonomous vehicles 105a-f and an enforcement server 115 via any standard or technology (e.g., GSM, CDMA, TDMA, WCDMA, LTE, EDGE, OFDM, GPRS, EV-DO, UWB, IEEE 802 including Ethernet, WiMAX, and/or others). According to present embodiments, the plurality of autonomous vehicles 105a-f transmit generated transactions to the enforcement server 115 via the networks 110. In some embodiments, the networks 110 may include a mesh or ad hoc network wherein a portion a of the plurality of autonomous vehicles 105a-f function as nodes of the mesh or ad hoc network. Thus, in some embodiments, a transaction generated at the autonomous vehicle 105a may be routed to, for example, the autonomous vehicle 105c and the autonomous vehicle 105f prior to the enforcement server 115. It should be appreciated that standard or technology used to communicate between and among the plurality of autonomous vehicles 105a-f is not necessarily the same standard or technology utilized to communicate between one of the plurality of autonomous vehicles 105a-f and the enforcement server 115. In addition to the transaction, in some embodiments, one or more of the plurality of autonomous vehicles 105 may exchange operational data over the mesh or ad hoc network in response to the one or more of the plurality of autonomous vehicles being involved in a collision.

According to certain aspects, the enforcement server 115 may be configured to compile new blocks to add to a blockchain and to enforce a plurality of smart contracts. Although FIG. 1A illustrates a single enforcement server 115, it should be appreciated that in some embodiments, the enforcement server 115 may be a plurality of interconnected servers, for example, in a cloud computing environment. In one aspect, the enforcement server 115 may periodically compile a plurality of transactions received from the plurality of autonomous vehicles 105. The enforcement server 115 may also aperiodically compile a plurality of transactions received from the plurality of autonomous vehicles 105 in response to receiving an urgent transaction. After the new block is compiled, the enforcement server 115 may transmit the new block to the plurality of autonomous vehicles 105 and/or dedicated validation entities 135 to generate a solution to incorporate the block into blockchain and/or to form a consensus on the solution. Although FIG. 1 illustrates that the dedicated validation entities as being separate from the enforcement server 115, it should be appreciated that the enforcement server 115 may itself include a module dedicated to generating a solution to the cryptographic puzzle and/or forming a consensus on the solution.

In another aspect, the enforcement server 115 may analyze a smart contract database (not depicted) to determine whether any transactions compiled into the new block are associated with a smart contract. To this end, the enforcement server 115 may extract from each transaction one or more indications identifying an autonomous vehicle and/or an operator of the autonomous vehicle and route the transaction to a respectively corresponding one or more smart contracts that govern the identified autonomous vehicle and/or operator. In one scenario, the transaction may include a plurality of data relating to the status of a trigger condition and/or one or more decision conditions. In response, the particular smart contract may direct the enforcement server 115 to perform an action to enforce the particular smart contract. For example, the action may be to generate and/or file an insurance claim. Depending on the action, the enforcement server 115 may execute one or more third party applications 125 to carry out the action. In the insurance claim example, a third party insurer may include an application configured to generate and/or process the insurance claim based upon data included in the transaction. As another example, an emergency response entity (e.g., an EMT) may include an application in the third party applications 125 to dispatch a responder to a location of an autonomous vehicle.

In some scenarios, a decision condition requires the analysis of data not generated at an autonomous vehicle. As an example, a decision condition may be related to a weather condition at the time liability occurred (e.g., the presence of rain when the liability was incurred). Accordingly, the smart contract may interact with one or more third party applications 125 to retrieve this additional decision condition data. In this example, one of the third party applications 125 may be a weather service application capable of outputting weather conditions at the location of the autonomous vehicle at the time indicated by the timestamp of the transaction. In one aspect, the smart contract may modify the transaction to include the additional condition data (assuming the transaction has not been compiled into a block) and/or generate a new transaction that indicates the additional condition data. The exemplary environment 100 may include additional, fewer, or alternate equipment or components, including those discussed elsewhere herein. Further, in some embodiments, the actions described as being performed by the enforcement server 115 may additionally or alternatively be performed at one or more of the autonomous vehicles 105*a-f*.

Figure 1B:
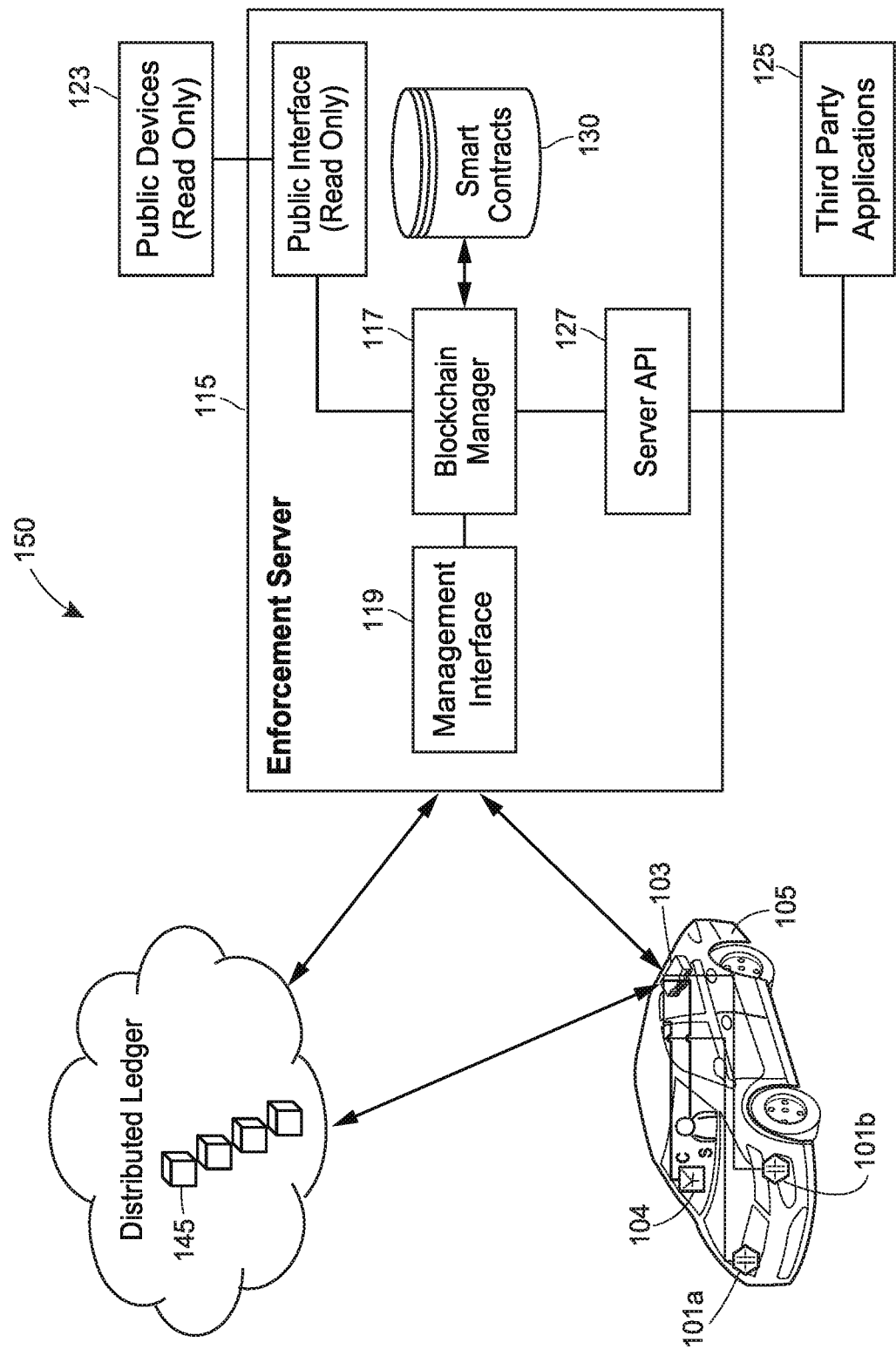
FIG. 1B depicts another exemplary environment including components and entities associated with maintaining a distributed ledger to facilitate the enforcement a plurality smart contracts associated with autonomous vehicles, in accordance with some embodiments.

Turning now to FIG. 1B, depicted is another exemplary environment 150 for maintaining a distributed ledger associated with autonomous vehicles. Although FIG. 1B depicts certain entities, components, and devices, it should be appreciated that additional or alternate entities and components are envisioned.

As illustrated in FIG. 1B, the environment 150 may include a distributed ledger 145. The distributed ledger 145 may be maintained via a network of nodes, including one or more autonomous vehicles 105 and/or an enforcement server 115. The nodes may have access distributed ledger 145 and/or generate data included in the distributed ledger 145. As described above, the distributed ledger 145 may not be changed without first forming a consensus on the change. Accordingly, as depicted by FIG. 1B, the distributed ledger 145 may be considered separate from any individual node, even though the individual nodes may store local copies of the distributed ledger 145.

According to certain aspects, as described with respect to FIG. 1A, the autonomous vehicle 105 may include a plurality of sensors 101*a-b,* an electronic device 103, and/or an antenna 104. The autonomous vehicle 105 may communicate with the enforcement server 115 via the electronic device 103 and/or the antenna 104.

As illustrated, the enforcement sever 115 may include a blockchain manager 117. The blockchain manager 117 may be a software program, engine, and/or a module that is executed by one or more processors interconnected with the enforcement server 115. In one embodiment, the blockchain manager 117 may compile a plurality of transactions into a block, update the distributed ledger 145 to include a block, route transaction data to one or more smart contracts, and/or automatically enforce one or more smart contracts. According to certain aspects, an operator of the enforcement server may interact with a management interface 119 to control aspects of the distributed ledger 145 and/or set control parameters associated with the blockchain manager 117. For example, a period for which blocks are generated may be set via the management interface 119. In an aspect, the plurality of smart contracts associated with the distributed ledger 145 may be stored in a smart contracts database 130. Although FIG. 1B depicts the smart contract database 130 as a part of the enforcement sever 115, the smart contract database may be maintained within the distributed ledger 145.

According to certain aspects, one or more public devices 123 may access data stored at the enforcement server via a public interface 121. The public interface 121 may be a read only interface that prevents the one or more public devices 123 from writing transactions to the distributed ledger 145. To this end, the one or more public devices 123 may be used, for example, to view data maintained within the distributed ledger 145, to view the status of one or more smart contracts associated with the distributed ledger 145, compile statistics regarding data maintained in the distributed ledger, and so on.

Additionally or alternatively, one or more third party applications 125 may interact with the distributed ledger 145 via an API 127 of the enforcement server 115. The third party applications 125 may be associated with one or more entities associated with an autonomous vehicle. For example, the third party applications 125 may include an application to generate and/or file an insurance claim, send a repair request, send a tow request, contact an emergency service provider, and so on. It should be appreciated that although FIG. 1B depicts the third party applications 125 as separate from the enforcement sever 115, in some embodiments a portion of the third party applications 125 may be stored locally at the enforcement server 115. The exemplary environment 150 may include additional, fewer, or alternate equipment or components, including those discussed elsewhere herein. Further, in some embodiments, the actions described as being performed by the enforcement server 115 may additionally or alternatively be performed at one or more of the autonomous vehicles 105.

Exemplary Flow Diagrams for Maintaining Distributed Ledger

Figure 2A:
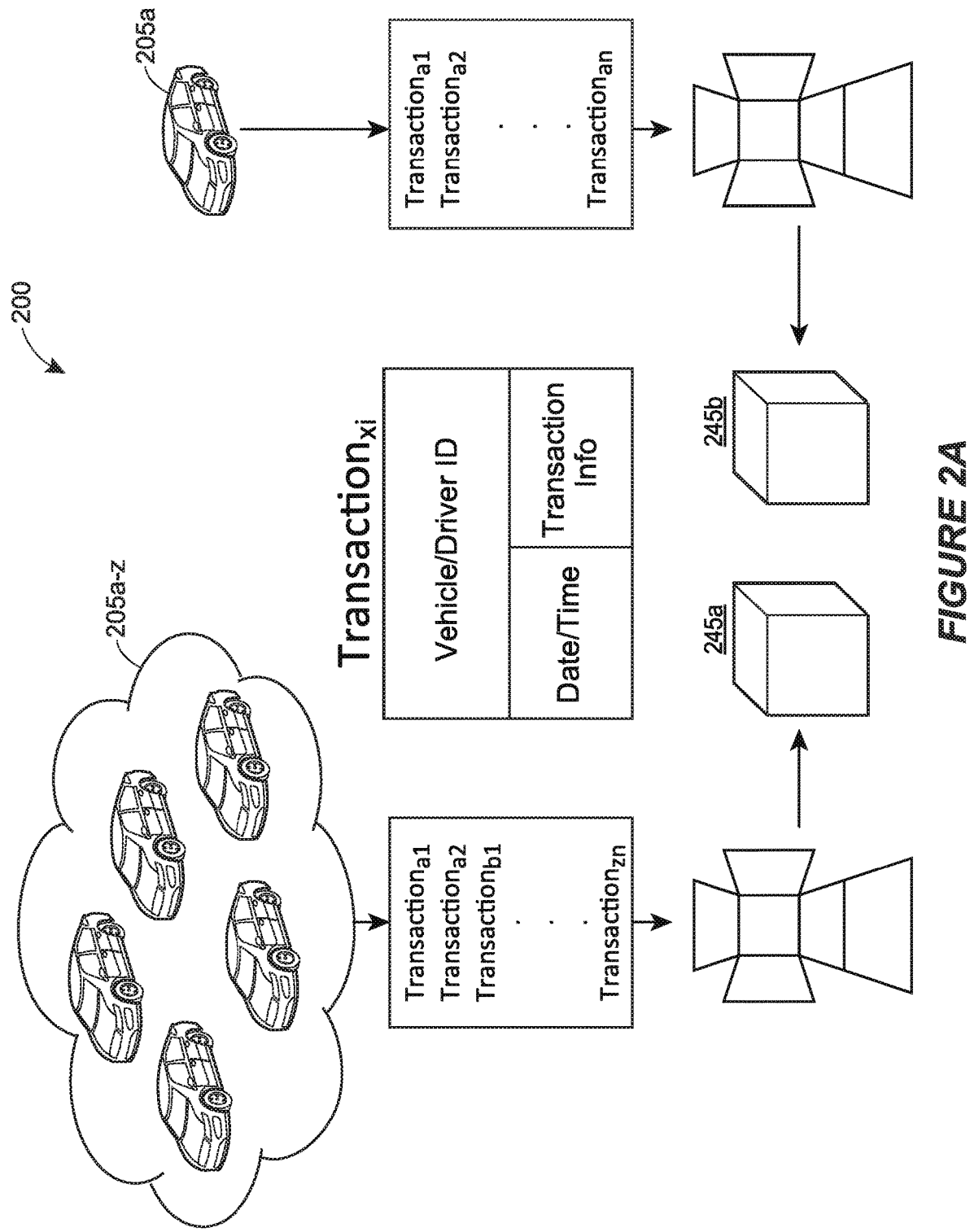
FIG. 2A depicts an exemplary flow diagram associated with compiling transactions into blocks of the distributed ledger, in accordance with some embodiments.

Turning now to FIG. 2A, illustrated is an exemplary flow diagram 200 associated with compiling a plurality of transactions into blocks. As illustrated, each transaction may include several components. A first component may include an identification of a vehicle and/or a driver associated with the transaction. The vehicle identification may be a VIN, an identifier assigned by a fleet operator, a license plate, or any other identifier that corresponds to a particular autonomous vehicle. The driver identification may be a name, a policy or account number, a username, or any other identifier that corresponds to a person operating the autonomous vehicle. Although the transaction illustrated by FIG. 2 only depicts a single vehicle or driver identification, it should be appreciated that some transactions may include an identification of a plurality of vehicles and/or drivers. For example, if multiple autonomous vehicles are involved in a collision, a single transaction may include a vehicle and/or driver identification for each autonomous vehicle involved in the collision. Further, each transaction may include a timestamp indicating a time the transaction was generated and/or a time the underlying data was measured.

Another component of each transaction may be a transaction information component. The transaction information may include a plurality of condition data that are analyzed by a smart contract associated with the vehicle and/or driver. In some aspects, the vehicle and/or driver identification and the timestamp may be viewed as a transaction header, whereas the transaction information may be viewed as the transaction payload. The transaction information may include an indication that a trigger condition occurred, an indication related to one or more decision conditions, and/or any underlying operational data generated by sensors within an autonomous vehicle that the condition indications are based upon. For example, the transaction information may include an indication that a liability inducing event occurred (e.g., a trigger condition) and/or an indication that the autonomous vehicle was operated in a manual operation mode (e.g., a decision condition).

According to illustrated embodiments, a plurality of transactions may be compiled into a block. In one scenario, a plurality of transactions generated by a plurality of autonomous vehicle 205a-z are compiled into a block 245a. For example, each of the plurality of autonomous vehicle may transmit transactions to an enforcement server (such as the enforcement server 115 as described with respect to FIG. 1) for compilation into the block 245a. In another example, an autonomous vehicle 205a compiles a plurality of transactions generated at the autonomous vehicle 205a into a block 245b that only includes transaction associated with the autonomous vehicle 205a. In this example, the autonomous vehicle 205a may transmit to the enforcement server the generated block 245b for distribution to a plurality of validation entities that attempt to solve a cryptographic puzzle based upon the header of the generated block 245b and/or form a consensus on said solution. The exemplary flow diagram 200 may include additional, fewer, or alternate actions, including those discussed elsewhere herein.

Figure 2B:
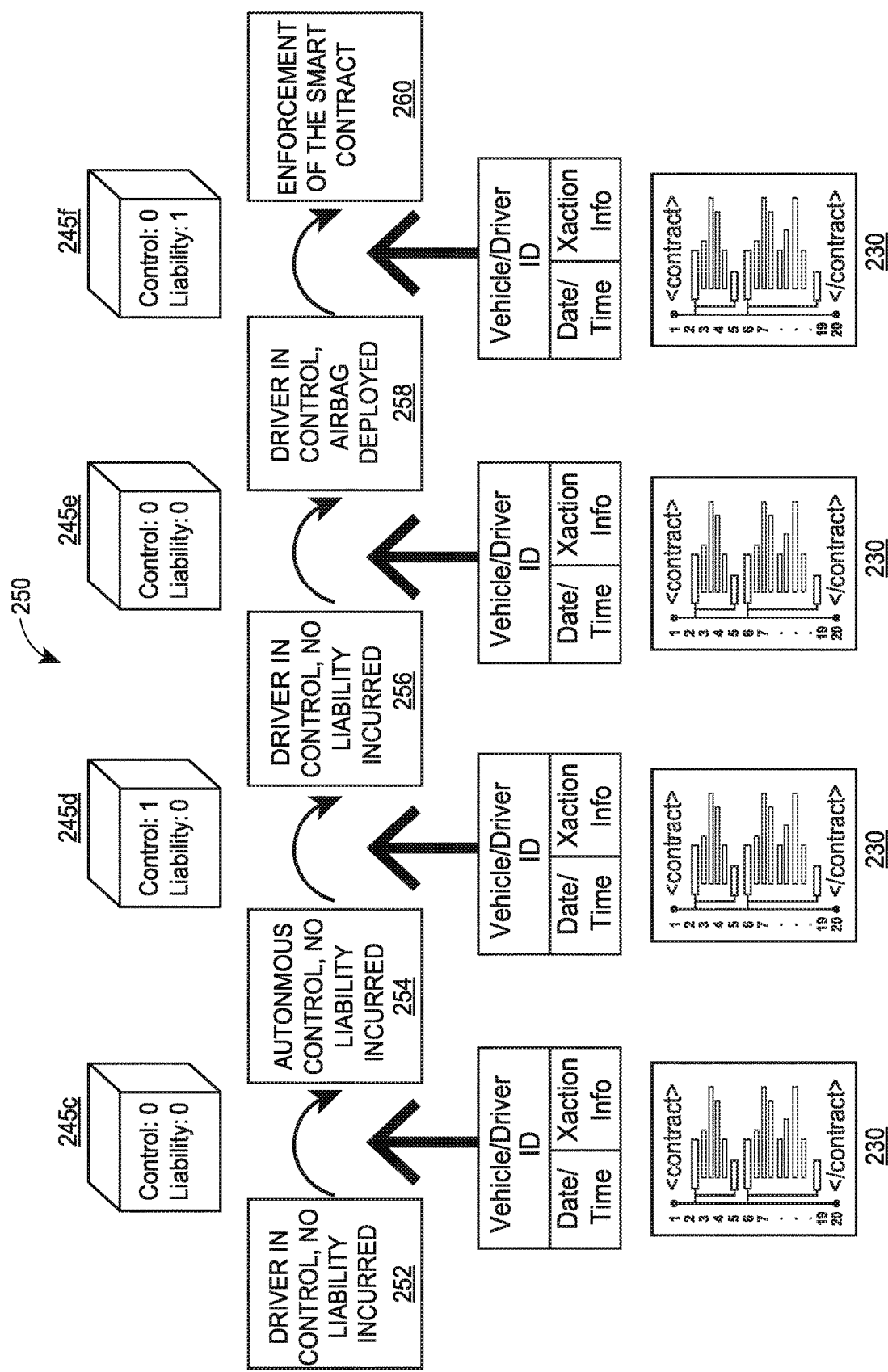
FIG. 2B depicts another exemplary flow diagram associated with compiling transactions into blocks of the distributed ledger, in accordance with some embodiments.

Turning now to FIG. 2B, depicted is an example flow diagram 250 indicating the generation of transactions in response to an autonomous vehicle, such as the autonomous vehicle 105a as described with respect to FIG. 1A. The autonomous vehicle may be associated with a smart contract 230. In some embodiments, the smart contract 230 is stored within a distributed ledger and/or at an enforcement server. Although the smart contract 230 depicted by the flow diagram 250 is associated with assigning liability based upon autonomous or manual control of the autonomous vehicle, it is envisioned that other smart contracts may be associated with arrangements based upon the detection of other events.

The flow diagram 250 may begin at block 252 where an operator of the autonomous vehicle is manually operating the autonomous vehicle and no liability has been incurred. For example, the operator may have powered on the autonomous vehicle and began to drive towards a destination. An electronic device associated with the autonomous vehicle may generate a transaction to be included in a block 245c of the distributed ledger. The transaction information component of this transaction may include a flag that indicates that the autonomous vehicle is being operated manually ("Control: 0") and/or a flag that indicates that the autonomous vehicle has not incurred liability ("Liability: 0").

At block 254, the operator of the autonomous vehicle may have engaged autonomous control functionality associated with the autonomous vehicle. For example, the operator may have instructed the autonomous vehicle to automatically drive to the destination. In response, the electronic device may generate a transaction to be included in block 245d of the distributed ledger. The transaction information component of this transaction may include a flag that indicates that the autonomous vehicle is being operated autonomously ("Control: 1") and/or a flag that indicates that the autonomous vehicle has not incurred liability ("Liability: 0").

At block 256, the operator of the autonomous vehicle may have disengaged autonomous control functionality associated with the autonomous vehicle. For example, the operator may resume manual control by interacting with manual control (e.g., a steering wheel, brake pedal, etc.). In response, the electronic device may generate a transaction to be included in block 245e of the distributed ledger. The transaction information component of this transaction may include a flag that indicates that the autonomous vehicle is being operated manually ("Control: 0") and/or a flag that indicates that the autonomous vehicle has not incurred liability ("Liability: 0").

At block 258, the autonomous vehicle may have incurred liability. For example, the autonomous vehicle may have experienced a collision. In the illustrated scenario, the autonomous vehicle may have deployed an airbag in response to detecting the collision. According to aspects, the electronic device may generate a transaction to be included in block 245f of the distributed ledger. The transaction information component of this transaction may include a flag that indicates that the autonomous vehicle is being operated manually ("Control: 0") and/or a flag that indicates that the autonomous vehicle has, in fact, incurred liability ("Liability: 1").

At block 260, one or more actions associated with enforcing the smart contract may be performed. To this end, when transactions included in the block 245f are routed to the smart contract 230, the smart contract 230 may analyze the transaction generated at block 258; more particularly, the transaction information component of the transaction generated at block 258. Based on this transaction information, the smart contract 230 may determine one or more actions to enforce the smart contract 230. As an example, the smart contract 230 may cause the enforcement server to generate an insurance claim that assigns liability for damage incurred in the collision to the operator of the autonomous vehicle. It should be appreciated that although FIG. 2B depicts blocks 245c-f are depicted as separate blocks, in some scenarios, one or more of the blocks 245c-f may actually be the same block. For example, the events at blocks 254 and 256 may have occurred within the block compilation period associated with the distributed ledger. The exemplary environment 250 may include additional, fewer, or alternate actions, including those discussed elsewhere herein.

For example, as described elsewhere herein, the autonomous vehicle may be operated remotely. Accordingly, the control state may include an indication that the autonomous vehicle is being remotely operated. In this example, when a liability-inducing event occurs, the smart contract 230 may cause the enforcement server to generate an insurance claim that assigns liability to an entity associated with a remote operator of the autonomous vehicle.

Exemplary Distributed Ledger Communication

Figure 3:
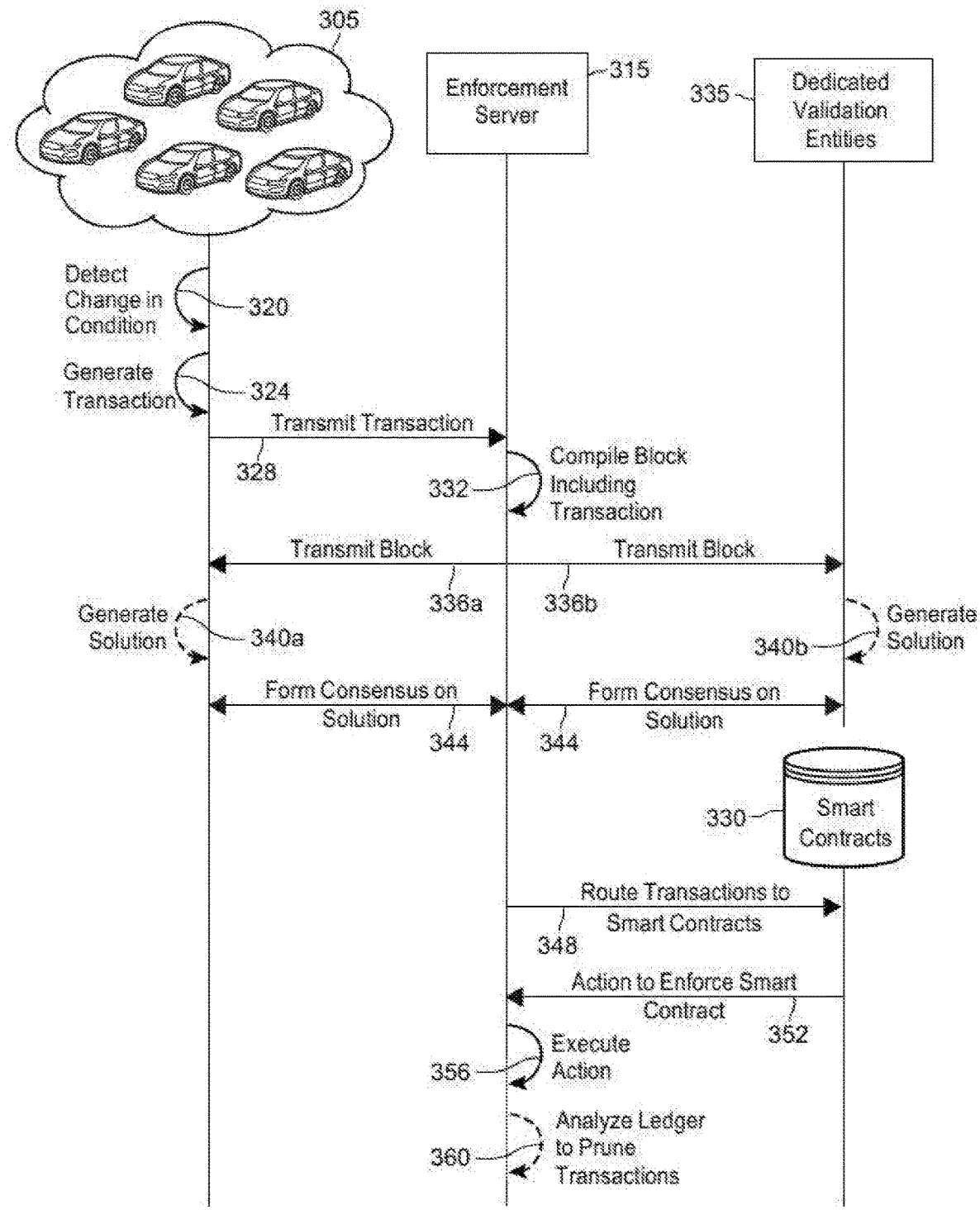
FIG. 3 depicts an exemplary signal diagram associated with maintain a distributed ledger associated with a plurality of smart contracts, in accordance with some embodiments.

Referring to FIG. 3, illustrated is an exemplary signal diagram 300 associated with maintaining a distributed ledger associated with a plurality of smart contracts. In particular, FIG. 3 may include a plurality of autonomous vehicles 305 (such as the plurality of autonomous vehicles 105a-f as described with respect to FIG. 1), an enforcement server 315 (such as the enforcement server 115 as described with respect to FIG. 1), dedicated validation entities 335 (such as the dedicated validation entities 135 as described with respect to FIG. 1), and/or a smart contracts database 330. Autonomous vehicles within the plurality of autonomous vehicles may be associated with an electronic device (such as the electronic device 103 as described with respect to FIG. 1) executing an application. It should be appreciated the electronic device may be any electronic device (e.g., an on-board computer, a smartphone, a desktop computer, a laptop, a tablet, phablet, netbook, notebook, a smart watch, smart glasses, smart contact lenses, wearable electronics device, other mobile device, etc.).

The signal diagram 300 may begin when one or more of the plurality of autonomous vehicles 305 detects (320) a change in a condition. In one scenario, the change in condition is associated with a decision condition of one or more smart contracts governing the autonomous vehicle. For example, the decision condition may relate to whether the vehicle is being operated in a manual or an autonomous mode as determined, for example, by detecting the presence of microvibrations in a steering wheel and/or a control signal communicated over a communication bus of the autonomous vehicle. In another example, the decision condition may relate to a distance traversed by the autonomous vehicle as determined, for example, by an odometer sensor. In another scenario, the change in condition is associated with a trigger condition of one or more smart contracts governing the autonomous vehicle. For example, the change in condition may be the autonomous vehicle incurring liability, such as a liability in response to damage to the autonomous vehicle. In this example, the trigger condition may be detected by detecting a deployment of an airbag, detecting an output from a front or side impact sensor, and/or detecting a malfunction or other abnormal condition for one or more sensors of the autonomous vehicle.

The one or more autonomous vehicles of the plurality of autonomous vehicles 305 may then generate (324) a transaction that indicates the detected change in condition. As described above with respect to the environment 200, the transaction may include an indication of an identity of one or more autonomous vehicles and/or operators thereof, a timestamp and/or a plurality of transaction data. According to certain aspects, when multiple autonomous vehicles of the plurality of autonomous vehicles 305 are involved in a collision, the involved autonomous vehicles may communicate with one another to generate a single transaction. To generate this single transaction, the involved autonomous vehicles may exchange operating data describing a time period straddling the collision to generate a transaction that indicates relative fault for the collision and/or one more amounts of liability incurred. In some further aspects, the autonomous vehicles may exchange diagnostic data to determine which autonomous vehicle should generate the transaction. For example, an antenna of a particular vehicle may have been damaged in the collision causing data transmissions therefrom to be susceptible to additional noise and/or data loss. Accordingly, a different autonomous vehicle involved in the collision may be assigned the task of generating the transaction.

According to other aspects, as part of generating the transaction, the autonomous vehicle may determine a priority of the transaction. To this end, not every transaction may have the same priority. For example, a transaction may indicate that significant damage occurred to a vehicle, rendering the vehicle inoperable and/or a passenger in a dangerous environment (e.g., the transaction indicates there is a leak in the gas tank). Accordingly, the autonomous vehicle may assign this transaction an urgent priority. On the other hand, in one example, for a transaction that indicates a shift between manual and autonomous control, or a transaction that indicates relatively minor damage (e.g., the autonomous vehicle experienced light damage to a bumper), the autonomous vehicle may assign the transaction a normal or other non-urgent priority.

After the one or more autonomous vehicles of the plurality of autonomous vehicles 305 generate the transactions, the one or more autonomous vehicles may transmit (328) the transactions to the enforcement server 315 via a communication network. In some embodiments, the communication network may include an ad hoc or mesh network comprised of the plurality of autonomous vehicles 305. At some point after receiving the transactions, the enforcement server 315 may compile (332) a new block of the distributed ledger that includes the transactions. As part of compiling the block, the enforcement server 315 may generate a hash value for each transaction included in the block. The enforcement server 315 may then cryptographically combine these hash values, such as through the use of a Merkle Tree, to generate a hash value of the block as a whole. The enforcement server 315 may include the hash value of the block as a whole in a header of the block.

In one embodiment, the enforcement server 315 may compile the block periodically (e.g., every five minutes, every ten minutes, etc.). It should be appreciated, that the period may change over time in an attempt to keep the block size below a threshold size. Generally, as more autonomous vehicles are included in the plurality of autonomous vehicles 305, more transactions are generated. As a result, over time, using a fixed period may result in more and more transactions being included in each block, thereby increasing the size of the average block. Accordingly, the enforcement server 315 may adjust (e.g., shorten) the compilation period to ensure that the average block size does not exceed the threshold size despite the reception of a greater volume of transactions. Further, according to aspects, the enforcement server 315 may compile the block aperiodically upon the reception of a transaction having an urgent priority.

The enforcement entity may transmit (336) the compiled block to one or more nodes of the distributed ledger. The nodes may include the dedicated validation entities 335 (236b) and/or a portion of the plurality of autonomous vehicles 305 (236a). The nodes that receive the block may attempt to generate (340) a solution to a cryptographic puzzle that is based upon the hash value included in the header in the block. After a particular node finds a solution to the cryptographic puzzle, the node may transmit the solution to the other nodes to verify the solution. The other nodes, such as the portion of the plurality of autonomous vehicles 305, the enforcement server 315, and/or the dedicated validation entities 335, may then form a consensus (344) on the solution found by the particular node. More particularly, the other nodes may vote to approve block's inclusion into the distributed ledger upon successfully verifying the solution. Consensus may be formed when over half of the nodes have voted for the inclusion of the block. It should be appreciated that finding the solution to the cryptographic puzzle involves significantly more processing power than verifying the solution. Accordingly, in some embodiments, pools of nodes may coordinate their processing power in an attempt to jointly find the solution to the cryptographic puzzle.

To this end, the enforcement server 315 may determine that a portion of the plurality of autonomous vehicles 305 participated in finding the verified solution to the cryptographic puzzle. To encourage participation in finding the solution, the enforcement server 315 may credit a respective account associated with each autonomous vehicle (and/or operator thereof) that participated in finding the verified solution with a currency. In some embodiments, the currency may be reward points. In other embodiments, the currency may be a cryptocurrency. It should be appreciated that in some scenarios, when multiple autonomous vehicles participated in finding the verified solution, each autonomous vehicle may have made an unequal contribution to the overall processing power. Accordingly, the enforcement server 315 may divide the credit between and among the portion of the plurality of autonomous vehicles 305 in accordance to the respective processing power contributed to finding the solution.

The signal diagram 300 continues when the enforcement server 315 routes (348) the plurality of transactions compiled into the block to the smart contract database 330. The smart contract database 330 may be maintained at the enforcement server 315 and/or within the distributed ledger itself. In one embodiment, routing a transaction may include extracting the indication(s) of the autonomous vehicle and/or the operator from the transaction and utilizing the indication(s) to query the smart contract database 330. If a particular smart contract matches the query (e.g., the smart contract governs an autonomous vehicle and/or operator thereof indicated by the transaction), routing may further include the particular smart contract processing the transaction information included in the transaction. To this end, the particular smart contract may determine whether a trigger condition occurred and/or analyze a plurality of condition data to determine one or more actions to perform in response to the trigger condition occurring. It should be appreciated that a plurality of transactions may be routed to a plurality of smart contracts. Accordingly, the plurality of smart contracts within the smart contract database 330 may generate a plurality of actions to enforce the smart contracts.

In one example, a particular smart contract may govern a relationship between an insurer and a manufacturer of a particular autonomous vehicle. In particular, the insurer may agree to cover liability incurred while the particular autonomous vehicle is operated in a manual mode; whereas the manufacturer may agree to cover liability incurred while the particular autonomous vehicle is operated in a fully or semi-autonomous mode. In this example, if the particular autonomous vehicle incurs liability, the particular autonomous vehicle may generate a transaction indicating the liability. When the transaction is routed to the particular smart contract, the particular smart contract may detect the presence of a trigger condition (i.e., incurring liability). Accordingly, the particular smart contract may then analyze condition data to determine whether the particular autonomous vehicle was operated in a manual or autonomous mode (e.g., a decision condition). If the particular autonomous vehicle was operated in a manual mode, the particular smart contract may determine that an action is to automatically generate an insurance claim that assigns liability to the insurer and/or the operator of the particular autonomous vehicle. On the other hand, if the particular autonomous vehicle was operated in an autonomous mode, the particular smart contract may determine that an action is to automatically generate an insurance claim that assigns liability to the manufacturer.

In a similar example, a particular smart contract may govern a relationship between an insurer and a remote operator of a particular autonomous vehicle. In particular, the insurer may agree to cover liability incurred while the particular autonomous vehicle is operated in a manual mode; whereas the remote operator may agree to cover liability incurred while the particular autonomous vehicle is remotely operated. In this example, if the particular autonomous vehicle incurs liability, the particular autonomous vehicle may generate a transaction indicating the liability. When the transaction is routed to the particular smart contract, the particular smart contract may detect the presence of a trigger condition (i.e., incurring liability). Accordingly, the particular smart contract may then analyze condition data to determine whether the particular autonomous vehicle was operated in a manual or remote mode (e.g., a decision condition). If the particular autonomous vehicle was operated in a manual mode, the particular smart contract may determine that an action is to automatically generate an insurance claim that assigns liability to the insurer and/or the operator of the particular autonomous vehicle. On the other hand, if the particular autonomous vehicle was operated in a remote mode, the particular smart contract may determine that an action is to automatically generate an insurance claim that assigns liability to the remote operator.

In another example, a particular smart contract may govern a relationship between an insurer and an operator of a particular autonomous vehicle. In particular, the insurer may agree to only cover liability incurred while the particular autonomous vehicle is operated within a mileage limit. Similarly, in this example, if the particular autonomous vehicle incurs liability, the particular autonomous vehicle may generate a transaction indicating the liability. When the transaction is routed to the particular smart contract, the particular smart contract may detect the presence of a trigger condition (i.e., incurring liability). Accordingly, the particular smart contract may then analyze condition data to determine whether the particular autonomous vehicle traversed a distance that exceeds the mileage limit (e.g., a decision condition). If the particular autonomous vehicle traversed a distance that exceeds the mileage limit, the particular smart contract may determine that an action is to automatically generate an insurance claim that assigns liability to the operator of the particular autonomous vehicle. Conversely, if the particular autonomous vehicle has not traversed a distance that exceeds the mileage limit, the particular smart contract may determine that an action is to automatically generate an insurance claim that assigns liability to the insurer.

In any event, the plurality of smart contracts in the smart contract database may transmit (352) the one or more determined actions to the enforcement server 315, which executes (356) the actions. In one embodiment, the enforcement server 315 may include a plurality of third party applications (such as the third party applications 125 as described with respect to FIG. 1) that may assist in the execution of the actions. For example, a manufacturer or insurer may provide an application that enables the enforcement server 315 to generate, file, and/or subrogate a claim with the manufacturer or insurer. As another example, the enforcement server 315 may interact with an application provided by an incident response service provider (e.g., a police entity, an EMT, a tow service, a fire department, an autonomous vehicle dispatch, etc.) to execute one or more actions to ensure the safety of persons affected by the event that incurred liability.

According to certain aspects, the enforcement server 315 may analyze (360) the distributed ledger to determine that a particular block of the distributed ledger includes one or more transactions that are no longer relevant to the plurality of smart contracts in the smart contract database 330. For example, a transaction in the particular block may include transaction information relating to a decision condition when a trigger condition did not occur (e.g., an autonomous vehicle completed a trip without incurring liability). As another example, the transaction may be older than a threshold age (e.g., older than thirty days). In response, in order to reduce the overall size of the distributed ledger, the enforcement server 315 may prune the transaction that is no longer relevant from the particular block. As explained above, the corresponding to the particular block is dependent on the header for the transaction. Accordingly, pruning may involve deleting the underlying data from the transaction (e.g., raw transaction information) while maintaining the header of the transaction. Thus, the amount of data stored in each block may be reduced without impacting the cryptographic link that secures the distributed ledger. In some embodiments, the pruned transaction and/or the data associated therewith may be copied to an archival database for record-keeping. It should be appreciated that signal diagram 300 may include additional, less, and/or alternative actions, including those discussed elsewhere herein. For example, in some embodiments, some of the actions described with respect to the enforcement server 315 may be alternatively performed by one or more of the plurality of autonomous vehicles 305, and/or vice versa.

Exemplary Methods of Maintaining Distributed Ledger

Figure 4:
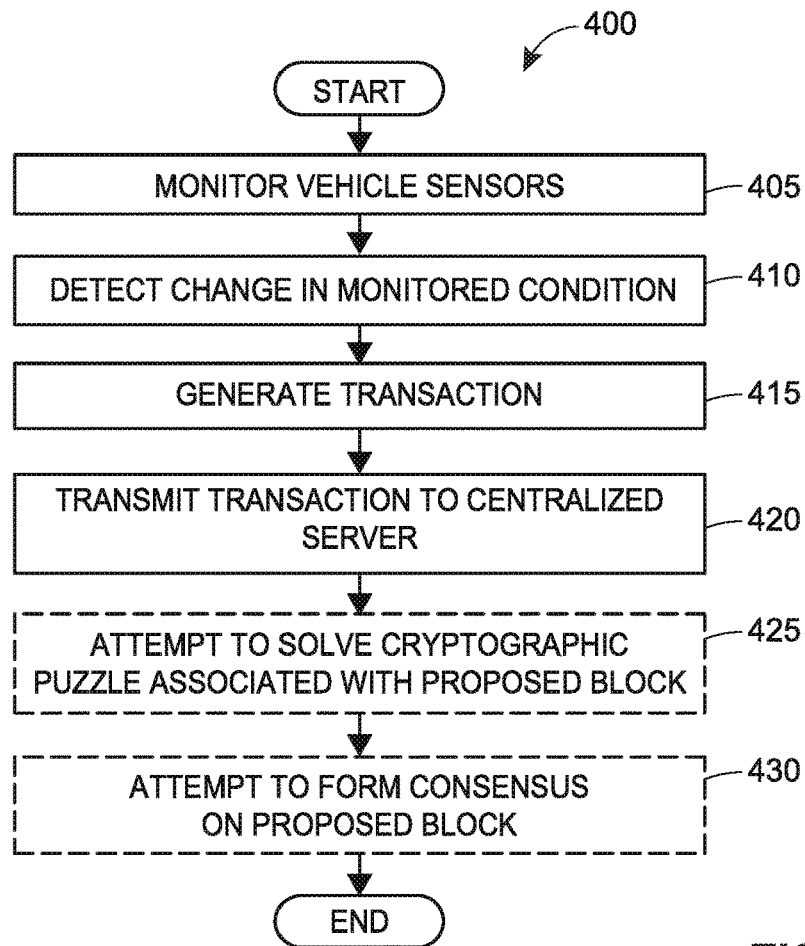
FIG. 4 depicts an exemplary flow diagram associated with processing transactions included in a distributed ledger, in accordance with some embodiments.

Referring to FIG. 4, depicted is a block diagram of an exemplary computer-implemented method 400 of processing transactions included in a distributed ledger. The method 400 may be facilitated by an electronic device associated with an autonomous vehicle, such as the electronic device 103 associated with the autonomous vehicle 105a as described with respect to FIG. 1, that may be in direct or indirect communication with an enforcement server, such as the enforcement server 115 as described with respect to FIG. 1.

The method 400 may begin by the electronic device monitoring a plurality of vehicle sensors (block 405). More particularly, the electronic device may monitor a plurality of data generated by the plurality of vehicle sensors. For example, the electronic device may monitor the output of an accelerometer, a gyroscope, a brake sensor, an impact sensor, an image/video sensor, an audio sensor, a pressure sensor, and/or any other sensor that monitors a condition associated with the autonomous vehicle. In some embodiments, the sensor data may be communicated over a communication bus associated with the autonomous vehicles. Additionally or alternatively, the sensor data may be communicated directly to the electronic device via a wireless or wired connection.

At block 410, the electronic device may analyze the sensor data to detect a change in a monitored condition. In one embodiment, the autonomous vehicle may be associated with one or more smart contracts, each associated with a trigger condition and/or a decision condition. An application executing on the electronic device may receive a subscription request to provide data streams relating to trigger conditions and/or decision conditions associated with one or more smart contracts. The application may be able to associate a trigger and/or decision condition with one or more sensors that are relevant to the requested data streams. For example, for a trigger condition of incurring liability, the application may cause the electronic device to monitor an impact sensor, an airbag deployment sensor, a gyroscope, an accelerometer, a window integrity sensor, or even a sensor of another autonomous vehicles and/or a smart infrastructure device proximate to the autonomous vehicle. In some embodiments, not only may the application associate the trigger and/or decision condition with the one or more relevant sensors, but also one or more expected ranges of values associated with one or more statuses associated with the trigger condition. In the above example, an accelerometer may be associated with a threshold value that, when exceeded, is indicative that the autonomous vehicle experienced a collision. Accordingly, for the accelerometer, an expected range of values for a status indicating no liability may be values below the threshold and an expected range of values for a status indicating liability may be values that exceed the threshold. For some sensors, for example a window integrity sensor, the expected range may be a Boolean value or another similar flag that indicates a status beyond raw measured statistics (e.g., the range includes, for example, TRUE or "SHATTERED," as opposed to, say, 8 $m/s^2$). In any event, the electronic device may monitor the data generated by the relevant sensors to detect whether a status for a trigger condition and/or a decision condition has changed. Additionally or alternatively, as described elsewhere herein, the status (and/or ranges of values indicative thereof) may be associated with an urgent, normal, low, and/or any other priority level.

At block 415, the electronic device may generate a transaction that describes the detected change in status for a trigger condition and/or a decision condition. As described elsewhere herein, the transaction may include an indication of the autonomous vehicle and/or an operator thereof, a time stamp, and/or a plurality of transaction information. In some embodiments, the transaction information includes an indication of the status of trigger and/or decision condition. Additionally or alternatively, the transaction information may include at least a portion of the raw data that indicated that change in the trigger and/or decision condition.

At block 420, the electronic device may transmit the generated transaction to the enforcement server for processing and/or compilation into a block to be added to the distributed ledger. In some embodiments, instead of the enforcement server compiling the transactions into the block, the electronic device may instead compile a plurality of transaction the electronic device generated (and/or received from another autonomous vehicle) into the proposed block. In these embodiments, transmitting the transaction to the enforcement server may include transmitting the proposed block that includes the transaction to the enforcement server.

At block 425, in embodiments wherein the electronic device is also a validation entity, the electronic device may attempt to solve a cryptographic puzzle based upon the header of the proposed block. It should be appreciated that because there are typically several validation entities attempting to solve the same cryptographic puzzle, the electronic device may never actually solve the cryptographic puzzle. To this end, once one validation entity claims to have solved the cryptographic puzzle, that validation entity may transmit its solution to the other validation entities for verification.

At block 430, in embodiments wherein the electronic device is also a validation entity, the electronic device may attempt to form a consensus on the solution. In scenarios in which another validation claims to have solved the cryptographic solution, the electronic device may attempt to verify the received solution. If the solution is successfully verified, the electronic device may vote to include the block in the distributed ledger. In scenarios in which the electronic device solved the cryptographic puzzle, the electronic device may be considered to have attempted to form the consensus when the electronic device sent the proposed solution to the other validation entities. It should be appreciated that the method 400 may include additional, less, or alternative actions, including those described elsewhere herein.

Figure 5:
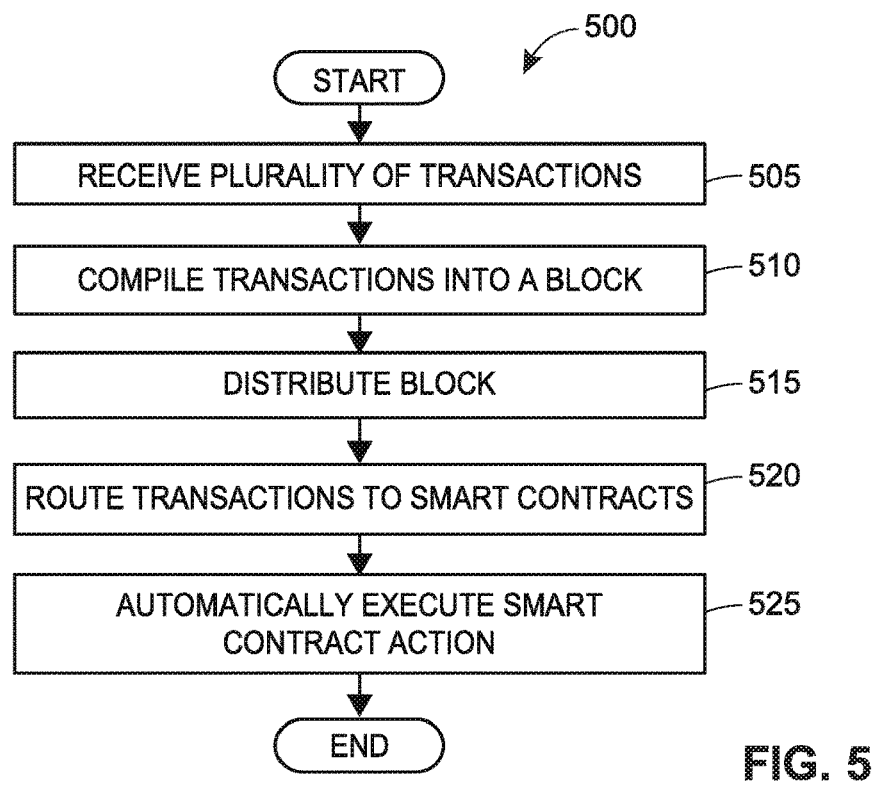
FIG. 5 depicts an exemplary flow diagram associated with processing transactions included in a distributed ledger, in accordance with some embodiments.

Referring now to FIG. 5, depicted is a block diagram of an exemplary computer-implemented method 500 of processing transactions included in a distributed ledger. The method 500 may be facilitated by an enforcement server, such as the enforcement server 115 as described with respect to FIG. 1, that may be in direct or indirect communication with a plurality of autonomous vehicles, such as the plurality of autonomous vehicles 105a-f as described with respect to FIG. 1, and interconnected with a smart contract database that stores a plurality of smart contracts.

The method 500 may begin by the enforcement server receiving a plurality of transactions from the plurality of autonomous vehicles (block 505). As described elsewhere herein, the transactions may include an indication of an autonomous vehicle that generated the transaction and/or an operator thereof, a time stamp, and/or a plurality of transaction information. According to aspects, the enforcement server may continue to receive transaction until the expiration of a threshold amount of time has expired and/or an urgent priority transaction is received.

At block 510, the enforcement server may compile the received transactions into a proposed block. As described elsewhere, compiling the block may involve cryptographically combining, such as through the use of a Merkle Tree, a hash value associated with each of the transactions to form a hash value associated with the block as a whole. This hash value may be included in the header file of the proposed block.

At block 515, the enforcement server may distribute the proposed block to a plurality of validation entities that attempt to solve a cryptographic puzzle based upon the hash value included in the header and a nonce value. In some embodiments, the plurality of validation entities may include a portion of the plurality of autonomous vehicles. At some point, the plurality of validation entities may form a consensus on the proposed block. Upon consensus, the proposed block may be included in the distributed ledger.

At block 520, the enforcement server may route the transactions included in the now included block to the plurality of smart contracts. As described above, routing may involve extracting an indication of the autonomous vehicle and/or operator thereof, utilizing the indication to query the database of smart contracts, and/or inputting the transaction information from the transaction into the smart contracts that match the query. If the transaction indicated that a trigger condition occurred, the smart contract may output an action that is to be performed to enforce the smart contract.

At block 525, the enforcement server may automatically execute the action that is to be performed to enforce the smart contract. For some actions, the enforcement server may utilize one or more third party applications accessible by the enforcement server. As an example, an emergency response entity may make an application accessible that enables the enforcement server to initiate an emergency response. For other actions, the enforcement server may be able to perform the action without the assistance of a third party application. As an example, the enforcement server may be able to generate and transmit a text message to an emergency contact without the assistance of a third party application. It should be appreciated that the method 400 may include additional, less, or alternative actions, including those described elsewhere herein.

Exemplary Enforcement Server

Figure 6:
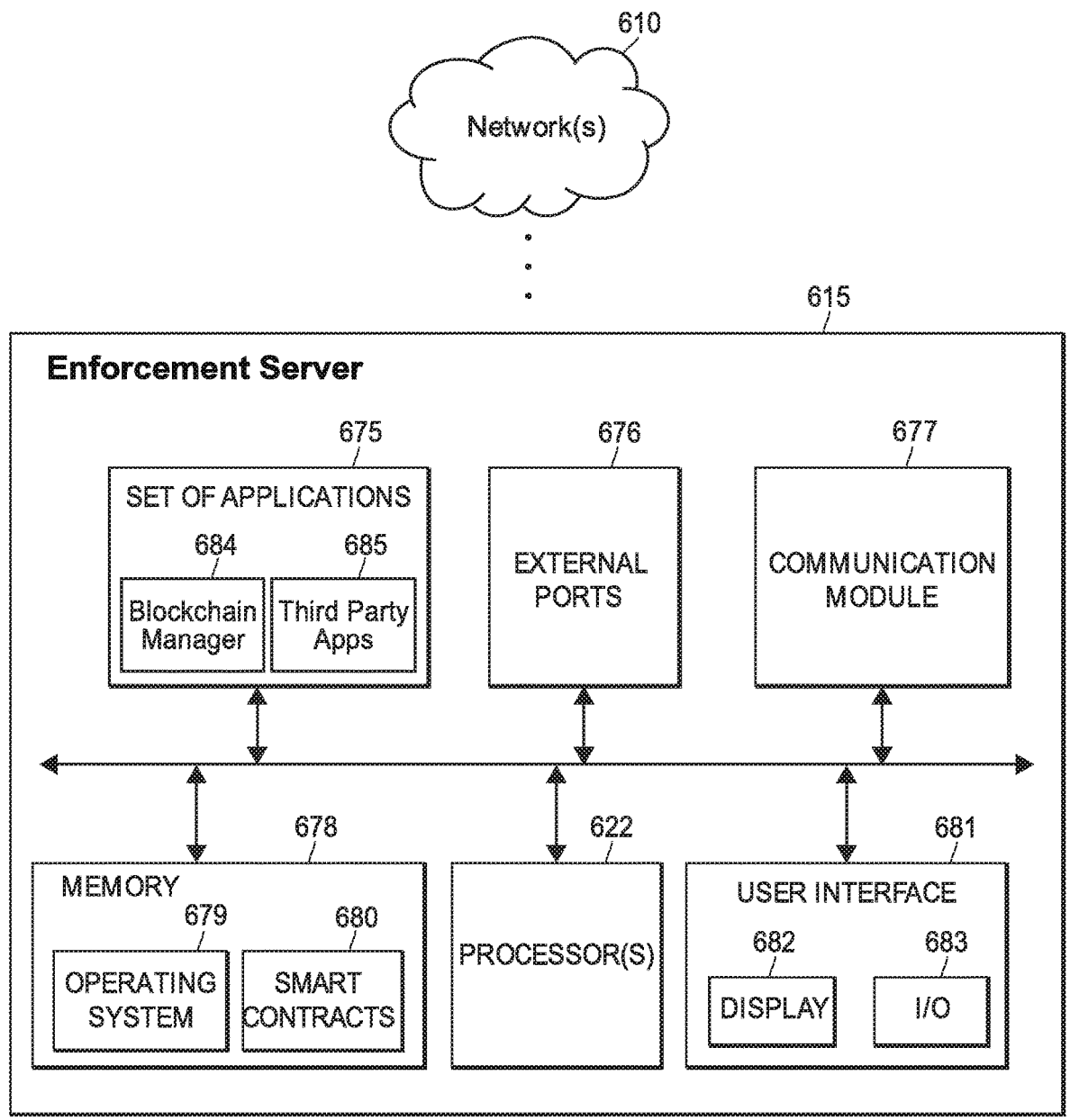
FIG. 6 depicts a block diagram of an enforcement server, in accordance with some embodiments.

FIG. 6 illustrates a diagram of an exemplary enforcement server 615 (such as the enforcement server 115 as discussed with respect to FIG. 1) in which the functionalities as discussed herein may be implemented. It should be appreciated that the enforcement server 615 may be associated with a distributed ledger that governs a plurality of smart contracts, as discussed elsewhere herein.

The enforcement server 615 may include a processor 622, as well as a memory 678. The memory 678 may store an operating system 679 capable of facilitating the functionalities as described herein. The enforcement server 615 may also store a set of applications 675 (i.e., machine readable instructions). For example, one application of the set of applications 675 may be a blockchain manager 684 configured to compile transactions into blocks and/or to route transactions to smart contracts. As another example, the set of applications 675 may include one or more third party applications 685 to assist in executing an action to enforce a smart contract. It should be appreciated that other applications may be included in the set of application 675.

The processor 622 may interface with the memory 678 to execute the operating system 679 and the set of applications 675. According to some embodiments, the memory 678 may also include a plurality of smart contracts 680. The blockchain manager 684 may access the smart contracts 680 to facilitate the enforcement of the smart contracts 680. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The enforcement server 615 may further include a communication module 677 configured to communicate data via one or more networks 610. Network(s) 610 may include a mesh network comprised of one or more autonomous vehicles. According to some embodiments, the communication module 677 may include one or more transceivers (e.g., WWAN, WLAN, and/or WPAN transceivers) functioning in accordance with IEEE standards, 3GPP standards, or other standards, and configured to receive and transmit data via one or more external ports 676. In some embodiments, the communication module 677 may include separate transceivers configured to interact with the local and remote networks separately. The enforcement server 615 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs, speakers, microphones). According to the present embodiments, the user may access the enforcement server 615 via the user interface 681 to monitor the distributed ledger, update software executing at the enforcement sever 615 and/or perform other functions. In some embodiments, the enforcement server 615 may perform the functionalities as discussed herein as part of a "cloud" network, or may otherwise communicate with other hardware or software components within the cloud to send, retrieve, and/or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the processor 622 (e.g., working in connection with the operating system 679) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Exemplary Autonomous Vehicle Event Distributed Ledger

Figure 7:
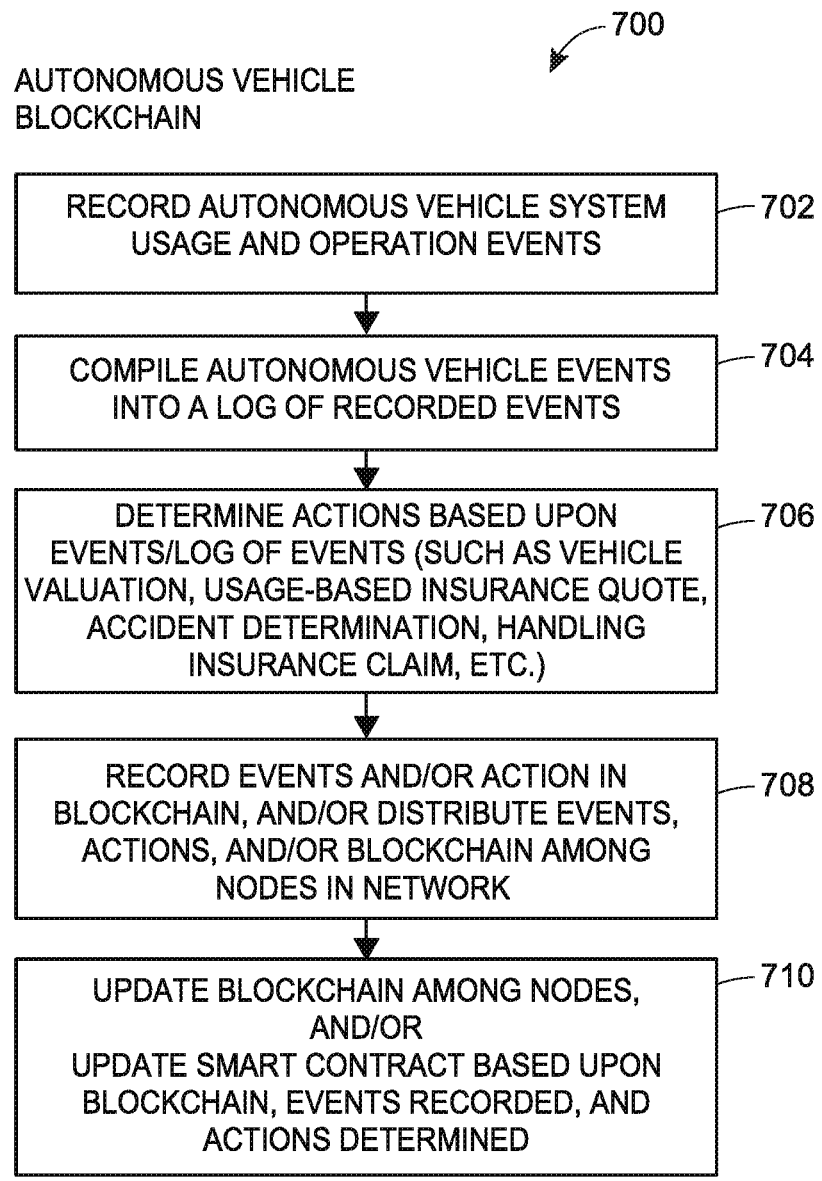
FIG. 7 depicts an exemplary computer-implemented method of creating and/or maintaining a distributed ledger or blockchain related to autonomous vehicle transactions and/or events.

FIG. 7 depicts an exemplary computer-implemented method of building, using, and/or maintaining a distributed ledger and/or blockchain related to autonomous vehicle transactions and/or events 700. The method 700 may include recording autonomous vehicle or system transactions and/or events 702. The transactions and/or events may detail an amount of usage, and/or type of usage, for each autonomous or semi-autonomous system or technology on an autonomous or semi-autonomous vehicle. The transactions and/or events may also detail an amount of operation and usage of the autonomous or semi-autonomous vehicle, including operation or usage under (i) autonomous (or processor) control, and (ii) human control, as well as detail which human of a household or company was driving the autonomous or semi-autonomous vehicle, and include a timestamp of when they were driving.

The method 700 may include compiling the autonomous vehicle or system transactions and/or events recorded into a log of events 704. For instance, the log may include transactions and/or events directed or related to autonomous vehicle usage (time of day, type of operation, type of control (autonomous/processor vs. human), location or area driven, miles driven, type of weather or environment driven in, etc.). The log may include transactions and/or events directed to individual or specific autonomous or semi-autonomous system or technology usage (such as whether used or not, an amount or time of usage, a type of setting, etc.).

The transactions and/or events recorded in the distributed ledger and/or blockchain may be determined or sensed by various smart sensors and/or processors. The transactions and/or events may detail (i) a setting that an autonomous or semi-autonomous system or technology is used at; (ii) how long the autonomous or semi-autonomous system or technology was used or employed (or not used or employed); (iii) the time of day or year during which the autonomous or semi-autonomous system or technology was used or employed (or not used or employed); (iv) the type of road (such as highway, rural, or city) on which the autonomous or semi-autonomous system or technology was used or employed (or not used or employed); (v) an identification of the human driver and/or how many passengers where in the vehicle; (vi) the environmental or weather conditions (rain, ice, snow, etc.) during which the autonomous or semi-autonomous system or technology was used or employed (or not used or employed); (vii) whether the autonomous or semi-autonomous system or technology was used or employed (or not used or employed) when recommended to be employed by a smart vehicle controller or other processor; (viii) the status, operational status, or working condition of each autonomous or semi-autonomous system or technology of an autonomous or semi-autonomous vehicle; (ix) a maintenance log of each autonomous system or technology on the autonomous or semi-autonomous vehicle; (x) whether recommended periodic maintenance has been performed on the autonomous or semi-autonomous vehicle, and/or on individual autonomous or semi-autonomous systems mounted by the vehicle; (xi) whether each autonomous system or technology is working as intended or not, such as via system self-checks; (xii) autonomous vehicle and/or autonomous vehicle system warranty information; (xiii) make, model, type, and/or version of autonomous vehicle system or software; (xiv) a timestamp of switching events during which control of the vehicle went from manual operation to autonomous operation, or vice versa; and/or (xv) a timestamp of engagement events during which an autonomous system was engaged or disengaged.

The method 700 may use the transactions and/or events recorded and/or log of events recorded (for the vehicle as a whole, and for individual autonomous or semi-autonomous vehicle systems or technologies) for various actions. The actions may include generating a usage-based insurance quote based upon past or expected future autonomous system or technology usage (which may be determined or predicted based upon the transactions and/or events recorded and/or the log of events recorded). The actions may include generating or estimating a current or actual value of the autonomous or semi-autonomous vehicle based upon the events recorded and/or the log of events recorded. The actions may include determining that the autonomous or semi-autonomous vehicle was involved in a vehicle collision, and/or assign percentage of fault for the vehicle collision (such as to the driver, the autonomous vehicle or system, or another vehicle or driver) based upon the events recorded and/or the log of events recorded. The actions may include handling insurance claims based upon the events recorded and/or the log of events recorded.

In one embodiment, the method 700 may employ machine or deep learning techniques on the autonomous vehicle transactions and/or events recorded in the log of events, and/or the blockchain or distributed ledger to determine an action or end result. For instance, the recorded events may be input into a machine learning algorithm trained to determine a usage-based insurance quote, a vehicle actual or replacement valuation, and/or that the autonomous vehicle was involved in a vehicle collision based at least in part on the recorded events associated with the autonomous vehicle, such as events related to individual autonomous vehicle feature or system usage (and/or amount thereof).

The method 700 may use the transactions and/or events recorded and/or the log of events recorded to update a blockchain 708 or form a consensus among distributed nodes that the blockchain should be updated, such as a blockchain related to point-in-time operator control and/or to an individual autonomous or semi-autonomous vehicle. For instance, the autonomous vehicle related events and/or actions determined may be distributed among nodes in a public or private network via wireless communication or data transmission over one or more radio links. The method 700 may update the blockchain at each node using the events, the individual events recorded, and/or the actions determined (including those mentioned above), and use the events and/or actions to update or generate one or more smart contracts 710. For instance, the smart contracts may relate to insurance quote generation, usage-based insurance quotes and contracts, and/or insurance claim handling.

The types of transactions and/or events recorded may relate to autonomous or semi-autonomous vehicle-related functionality or technology that replace human driver actions, and may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality.

With the present embodiments, the events or transactions recorded may relate to autonomous or semi-autonomous vehicle technology or functionality directed toward: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or back-up systems; navigation or GPS-related systems; security and/or anti-hacking measures; and/or theft prevention systems.

In one aspect, a computer-implemented method of building, utilizing, and/or maintaining an autonomous vehicle-related event blockchain may be provided. The method may include one or more of the following, and the sequence of actions may be rearranged: (1) detecting and/or recording, via one or more processors, sensors, and/or transceivers, autonomous vehicle events, the autonomous vehicle events including autonomous vehicle system or technology usage or operational events; (2) compiling, via the one or more processors, the autonomous vehicle events into a log of recorded autonomous vehicle events; (3) determining, via the one or more processors, an action to implement based upon the autonomous vehicle events recorded and/or the log of recorded autonomous vehicle events; (4) forming a consensus with other distributed nodes to update and/or otherwise updating, via the one or more processors, an autonomous vehicle-related blockchain to reflect or otherwise show (i) the autonomous vehicle events recorded, (ii) the log of recorded autonomous vehicle events, and/or (iii) the action to implement; and/or (5) distributing, via the one or more processors and/or transceivers, the log of recorded autonomous vehicle events and/or the autonomous vehicle-related blockchain to a public or private network of distributed nodes to facilitate maintaining the shared ledger of autonomous vehicle events up-to-date. The method may include additional, less, or alternate actions, including those discussed elsewhere herein.

For instance, the method may include updating a smart contract based upon the blockchain, events records, and/or actions determined to implement. The action determined to implement based upon the autonomous vehicle events recorded and/or the log of recorded autonomous vehicle events may be (i) estimating an actual value of the autonomous vehicle; (ii) estimating a replacement cost of the autonomous vehicle; (iii) generating a usage-based insurance quote for the autonomous vehicle and/or a specific trip; and/or (iv) to determine that the autonomous vehicle was involved in a vehicle collision, and to commence a claim handling process.

The autonomous vehicle events recorded may be related to at least one of the following autonomous vehicle systems, features, or technologies: driver alertness monitoring; driver responsiveness monitoring; pedestrian detection; artificial intelligence; a back-up system; a navigation system; a positioning system; a security system; an anti-hacking measure; a theft prevention system; and/or remote vehicle location determination.

In another aspect, a computer system configured to build and utilize an autonomous vehicle-related event distributed ledger and/or blockchain may be provided. The computer system may include one or more processors, sensors, and/or transceivers configured to perform one or more of the following, and the order of actions may be rearranged: (1) detect and/or record autonomous vehicle events, the autonomous vehicle events including autonomous vehicle system or technology usage or operational events; (2) compile the autonomous vehicle events into a log of recorded autonomous vehicle events; (3) determine an action to implement based upon the autonomous vehicle events recorded and/or the log of recorded autonomous vehicle events; (4) form a consensus with other distributed nodes to update and/or otherwise update an autonomous vehicle-related blockchain to reflect or otherwise show (i) the autonomous vehicle events recorded, (ii) the log of recorded autonomous vehicle events, and/or (iii) the action to implement; and/or (5) distribute the log of recorded autonomous vehicle events and/or the autonomous vehicle-related blockchain to a public or private network of distributed nodes to facilitate maintaining the shared ledger of autonomous vehicle events up-to-date. The computer system may include additional, less, or alternate functionality, including that discussed elsewhere herein.

In one aspect, a computer-implemented method for maintaining a distributed ledger and/or blockchain of autonomous vehicle-related transactions and/or events pertaining to one or more smart contracts and/or autonomous vehicles may be provided. The method may include the following actions, and the actions may be performed in various orders: (1) receiving, at one or more processors, one or more autonomous vehicle-related transactions and/or events from one or more autonomous vehicles, the autonomous vehicle-related transactions and/or events indicative of at least one of a trigger condition or a decision condition associated with one or more smart contracts; (2) compiling, by the one or more processors, the one or more autonomous vehicle-related transactions and/or events into a block of transactions and/or events; (3) distributing, by the one or more processors, the block of transactions and/or events to a plurality of validation entities via wireless or data transmission over one or more radio links or wireless communication channels to form a consensus on an update to (and/or whether or not to update) the distributed ledger and/or blockchain; (4) routing, by the one or more processors, the one or more autonomous vehicle-related transactions and/or events within the block to respective or corresponding smart contracts, wherein a particular transaction corresponding to a particular smart contract indicates that a trigger condition for the particular smart contract has occurred; and/or (5) automatically executing, by the one or more processors, an action the particular smart contract directs should be performed in response to the particular trigger condition, the action determined based upon a decision condition included in a transaction and/or event routed to the particular smart contract. The method may include additional, less, or alternate actions, including those discussed elsewhere herein, and may be implemented via computer systems and/or non-transitory computer readable medium.

In another aspect, a computer-implemented method for maintaining a distributed ledger or blockchain of transactions or events pertaining to autonomous vehicles may be provided. The method may include one or more of the following: (1) receiving, at one or more processors, one or more autonomous vehicle-related transactions or events from one or more autonomous vehicles, the transactions indicative of at least one of a trigger condition; (2) compiling, by the one or more processors, the one or more autonomous vehicle-related transactions or events into a block of transactions or events; (3) distributing, by the one or more processors, the block of autonomous vehicle-related transactions or events to a plurality of validation entities or nodes within a communication network to form a consensus on whether or not to update the distributed ledger; and/or (4) when a consensus is formed, updating, by the one or more processors, the distributed ledger at the plurality of validation entities or nodes to facilitate maintaining a distributed ledger or blockchain associated with autonomous vehicle-related transactions or events up-to-date. The method may include additional, less, or alternate actions, including those discussed elsewhere herein, and may be implemented via computer systems and/or non-transitory computer readable medium.

For instance, the method may include routing, by the one or more processors, the plurality of transactions or events within the block to a plurality of smart contracts, wherein a particular transaction or event corresponding to a particular smart contract may indicate that a trigger condition for the particular smart contract has occurred. The method may include automatically executing, by the one or more processors, an action the particular smart contract directs should be performed in response to the particular trigger condition, the action may be determined based upon a decision condition included in a transaction or event routed to the particular smart contract.

The trigger condition for the particular smart contract may be related to a particular autonomous vehicle incurring liability or being involved in a vehicle collision; and/or the particular transaction or event may indicate that the particular autonomous vehicle incurred liability or was involved in a vehicle collision. The decision condition for the particular smart contract may be a control state of the particular autonomous vehicle; and/or the particular transaction or event may indicate whether the particular autonomous vehicle was being autonomously or manually operated.

In another aspect, a computer-implemented method of building, utilizing, and/or maintaining an autonomous vehicle-related event distributed ledger or blockchain may be provided. The method may include one or more following, and in various order: (1) detecting and/or recording, via one or more processors, sensors, and/or transceivers, autonomous vehicle-related events, one or more autonomous vehicle-related events including autonomous vehicle system or technology usage or operational events; (2) compiling, via the one or more processors, the one or more autonomous vehicle events into a log of recorded autonomous vehicle-related events; (3) determining, via the one or more processors, an action to implement based upon the autonomous vehicle-related events recorded and/or the log of recorded autonomous vehicle events; and/or (4) distributing, via the one or more processors and/or transceivers, the log of recorded autonomous vehicle-related events and/or the action to implement to a public or private network of distributed nodes (such as via wireless communication or data transmission over one or more radio links or wireless communication channels) to facilitate maintaining a shared ledger of autonomous vehicle-related events up-to-date. The method may include additional, less, or alternate actions, including those discussed elsewhere herein, and may be implemented via computer systems and/or non-transitory computer readable medium.

Exemplary Autonomous Vehicle Embodiments

In one aspect, a computer-implemented method for maintaining a distributed ledger of transactions pertaining to a plurality of smart contracts may be provided. The method may include (1) monitoring, by one or more processors, a plurality of sensors associated with a vehicle; (2) detecting, by the one or more processors, a change in a condition of the vehicle, the condition being associated with a smart contract of the plurality of smart contracts that governs the vehicle and/or an operator of the vehicle; (3) generating, by the one or more processors, a transaction describing the detected change in the condition of the vehicle; and/or (4) transmitting, to a server, the transaction. The method may include additional, less, or alternate actions, including those discussed elsewhere herein.

For instance, the method may include compiling, by the one or more processors, the transaction into a block of transactions, the block being an update to the distributed ledger. Transmitting the transaction to the server may include transmitting, to the server, the block of transactions.

The method may include receiving, from the server, a subscription request indicating the condition of the vehicle; and associating, by the one or more processors, the condition of the vehicle with a set of the plurality of sensors associated with the vehicle. The subscription request may indicate one or more expected ranges of values for outputs of the set of the plurality of sensors, the expected ranges of values being associated with one or more states corresponding to the condition of the vehicle and/or one or more operational states of one or more autonomous vehicle systems or technologies, including those discussed herein.

Detecting the change in the condition of the vehicle may include detecting, by the one or more processors, that an output of a sensor (such as an autonomous vehicle system or technology sensor, or other vehicle-mounted sensor) the set of the plurality of sensors changed from a first expected range of values to a second expected range of values.

The change in the condition of the vehicle may be indicative of a collision with another vehicle. The method may include receiving, from the other vehicle, operating data generated by one or more sensors of the other vehicle, and the sensors of the other vehicle may be associated with an autonomous vehicle system of the other vehicle.

The method may include analyzing, by the one or more processors, the operating data to determine a relative fault between a party associated with the vehicle and a party associated with the other vehicle, and/or a relative fault between the vehicles if the vehicles are autonomous or semi-autonomous vehicles, or relative fault between different autonomous vehicle systems or technologies mounted on one or more vehicles.

The method may include analyzing, by the one or more processors, the operating data to determine that the vehicle, and not the other vehicle, should generate the transaction. The operating data may indicate that an antenna associated with the other vehicle is damaged.

The method may include receiving, from a node of the distributed ledger, a proposed block to add to the distributed ledger; and attempting, by the one or more processors, to solve a cryptographic puzzle based upon a header of the proposed block. When the one or more processors solve the cryptographic puzzle, the method may include transmitting, to one or more nodes of the distributed ledger, a solution to the cryptographic puzzle.

The method may include receiving, from a node of the distributed ledger, a proposed solution to the cryptographic puzzle; verifying, by the one or more processors, the proposed solution to the cryptographic puzzle; and/or communicating, with one or more nodes of the distributed ledger, whether or not the proposed solution to the cryptographic puzzle was verified in an attempt to from a consensus on the proposed solution.

The vehicle may be an autonomous vehicle, and the change in a condition of the vehicle is a change in operation or operational state (such as on, off, hi, low, etc.) of an autonomous vehicle system or technology mounted on the autonomous vehicle. The autonomous vehicle system or technology may be associated with or related to: driver alertness monitoring; driver responsiveness monitoring; pedestrian detection; artificial intelligence; a back-up system; a navigation system; a positioning system; a security system; an anti-hacking measure; a theft prevention system; and/or remote vehicle location determination.

In another aspect, a computer system for maintaining a distributed ledger of transactions pertaining to a plurality of smart contracts may be provided. The computer system may include one or more processors; a communication module adapted to communicate with one or more nodes of the distributed ledger; and a non-transitory program memory coupled to the one or more processors and storing executable instructions that, when executed by the one or more processors, cause the computer system to: (1) monitor a plurality of sensors associated with a vehicle; (2) detect a change in a condition of the vehicle, the condition being associated with a smart contract of the plurality of smart contracts that governs the vehicle and/or an operator of the vehicle, or governs an autonomous vehicle system or technology mounted on the vehicle; (3) generate a transaction describing the detected change in the condition of the vehicle; and/or (4) transmit, to a server, the transaction. The computer system may include additional, less, or alternate functionality, including that discussed elsewhere herein.

In another aspect, a computer-implemented method for maintaining a distributed ledger of transactions pertaining to one or more smart contracts may be provided. The method may include (1) monitoring, by one or more processors, one or more sensors associated with a vehicle; (2) detecting, by the one or more processors, a change in a condition of the vehicle, the condition being associated with a smart contract that governs the vehicle and/or an operator of the vehicle, or governs an autonomous vehicle system or technology mounted on the vehicle; (3) generating, by the one or more processors, a transaction describing the detected change in the condition of the vehicle; and/or (4) transmitting, to a server, the transaction. The method may include compiling, by the one or more processors, the transaction into a block of transactions, the block being an update to the distributed ledger, and/or transmitting, to the server, the block of transactions. The method may include additional, less, or alternate actions, including those discussed elsewhere herein.

In another aspect, a computer system for maintaining a distributed ledger of transactions pertaining to one or more smart contracts may be provided. The computer system may include one or more processors; a communication module adapted to communicate with one or more nodes of the distributed ledger; and a non-transitory program memory coupled to the one or more processors and storing executable instructions that, when executed by the one or more processors, cause the computer system to: (1) monitor one or more sensors associated with an autonomous or other vehicle; (2) detect a change in a condition of the vehicle, the condition being associated with a smart contract that governs the vehicle and/or an operator of the vehicle; (3) generate a transaction describing the detected change in the condition of the vehicle; and/or (4) transmit, to a server, the transaction. The computer system may include additional, less, or alternate functionality, including that discussed elsewhere herein.

In another aspect, a computer-implemented method for maintaining a distributed ledger of transactions pertaining to an autonomous vehicle may be provided. The method may include (1) monitoring, by one or more processors, one or more sensors associated with an autonomous vehicle; (2) detecting, by the one or more processors, a change in a condition of the autonomous vehicle, the condition being associated with operation, or an operational state, of an autonomous vehicle system or technology mounted on the autonomous vehicle; (3) generating, by the one or more processors, a transaction describing the detected change in the condition of the vehicle; and/or (4) transmitting, to a server, the transaction. The method may include compiling, by the one or more processors, the transaction into a block of transactions, the block being an update to the distributed ledger, and/or transmitting, to the server, the block of transactions. The method may include additional, less, or alternate actions, including those discussed elsewhere herein.

In another aspect, a computer system for maintaining a distributed ledger of transactions pertaining to an autonomous vehicle may be provided. The computer system may include one or more processors; a communication module adapted to communicate with one or more nodes of the distributed ledger; and a non-transitory program memory coupled to the one or more processors and storing executable instructions that, when executed by the one or more processors, cause the computer system to: (1) monitor one or more sensors associated with an autonomous vehicle; (2) detect a change in a condition of the vehicle, the condition being associated with operation, or an operational state, of an autonomous vehicle system or technology mounted on the autonomous vehicle; (3) generate a transaction describing the detected change in the condition of the autonomous vehicle; and/or (4) transmit, to a server, the transaction. The system may include additional, less, or alternate functionality, including that discussed elsewhere herein.

In another aspect, a computer-implemented method for maintaining a distributed ledger of transactions pertaining to one or more smart contracts may be provided. The method may include (1) monitoring, by one or more processors, a plurality of sensors associated with an autonomous vehicle; (2) detecting, by the one or more processors, a change in a condition of the autonomous vehicle, the condition being associated with a smart contract (such as a warranty, maintenance, service, or other contract) that governs an autonomous vehicle system or technology employed by or mounted on the autonomous vehicle; (3) generating, by the one or more processors, a transaction describing the detected change in the condition of the autonomous vehicle; and/or (4) transmitting, to a server, the transaction. The method may include additional, less, or alternate actions, including those discussed elsewhere herein.

In another aspect, a computer system for maintaining a distributed ledger of transactions pertaining to a one or more smart contracts may be provided. The computer system may include: one or more processors; a communication module adapted to communicate with one or more nodes of the distributed ledger; and a non-transitory program memory coupled to the one or more processors and storing executable instructions that, when executed by the one or more processors, cause the computer system to: (1) monitor one or more sensors associated with an autonomous vehicle; (2) detect a change in a condition of the vehicle, the condition being associated with a smart contract that governs an autonomous vehicle technology or system employed by or mounted on the autonomous vehicle; (3) generate a transaction describing the detected change in the condition of the autonomous vehicle; and/or (4) transmit, to a server, the transaction. The system may include additional, less, or alternate functionality, including that discussed elsewhere herein.

Additional Considerations

An authoritative, trusted, immutable, distributed, shareable, secure system may be needed to record if a human driver is controlling a vehicle, and/or if the vehicle is acting autonomously. The record may include crash sensor data to record crash information correlating to driver control information.

Blockchain technology may be used to store the transactions of control instances (from autonomous to human control to autonomous, for example). These control instances may be stored as they occur into blocks. Accordingly, this data may be included into the distributed ledger environment of the blockchain. In this environment, a consensus system may fix the events/blocks immutably and securely. At the same time and from separate systems, vehicle sensor data may also be stored into the block at various intervals by block management software (for example, an airbag deployed flag may remain at "0" prior to deployment, but becomes fixed to "1" after airbags deploy). This information may denote if a crash has occurred. In an aspect, this information is also synched to the same timestamps as the driver control events.

The data of automobile control and accident sensor flags may be streamed via the various systems in the car by existing technologies in the automobile. For example, a vehicle's steering wheel, when in autonomous mode, may be exposed to micro-vibrations; when a human driver grabs the wheel, the micro-vibrations may stop. This may be indicative of the steering system shifting to manual control. This shift may be logged in a control status event. The blockchain management software in the automobile may take this reported information (the status changing from autonomous to human control) and write into the block the timestamp, geo-location, speed, and any other data as prescribed (by the manufacturer, insurers, consumer groups, regulatory, law enforcement, and/or other organizations that may have input into what data should be reported).

The blockchain driver control and accident reporting system may be software composed of data aggregation from various automotive systems in a vehicle, a blockchain management system for writing driving control events to a block, and/or a means of passing this information (with the auto ID and user key signature/public ID) to a distributed ledger blockchain platform (such an Ethereum or similar system) via a mobile cellular, satellite, Wi-Fi, and/or other wireless data transmission technologies.

In some scenarios, the driver control and accident reporting blockchain may have public interfaces that allow visibility into the data. In an embodiment, a private blockchain interface may also be used by auto manufacturers, law enforcement, insurers, and regulatory agencies.

An element of smart contracts may also be enabled in the system. Depending on the sequence of events in the blockchain, terms of the smart contract may be executed immediately, such as sending a tow truck to the geolocation if tow assistance is a part of the policy, filing a legal action by a subrogation team of an insurer is brought against an auto manufacturer (for example, if an accident occurs when the autonomous vehicle was in autonomous control), conducting a policy review, filing a police report request with the jurisdiction of the roadway, processing claims awards made (for example, a partial payment if deductible is met, to handle car rental or minor medical expense), sending a cancellation notice for the policy, and so on.

In embodiments in which the blockchain is associated with an automotive or insurance consortium, and in a two or more car collision with vehicles containing this blockchain driver control and accident monitoring systems, it is possible that information (geolocation, timestamps, other information) can be shared between and among actors. This data may indicate that two cars collided, and the insurance information may be contained in the blockchain. The smart contract may be enforced, for example, to dispatch insurance claims personnel, and/or begin an automatic process to contact the other insurance companies involved.

In some aspects, customers may opt-in to a rewards, loyalty, or other program. The customer may allow a remote server, such as an enforcement server, to collect sensor, telematics, vehicle, mobile device, and other types of data discussed herein. With customer permission or affirmative consent, the data collected may be analyzed to provide certain benefits to customers. For instance, insurance cost savings may be provided to lower risk or risk averse customers. As described herein, rewards, including cryptocurrency, may be awarded to accounts associated with the customer. The other functionality discussed herein may also be provided to customers in return for them allowing collection and analysis of the types of data discussed herein, as well as participating in the validation of the data discussed herein.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for maintaining a distributed ledger or blockchain of transactions or events pertaining to autonomous vehicles, wherein the distributed ledger or the blockchain is configured to periodically compile blocks of transactions, the method comprising:
   receiving, at one or more processors, one or more autonomous vehicle-related transactions or events from one or more autonomous vehicles via a mesh network formed of multiple autonomous vehicles;
   determining, by the one or more processors, that the one or more transactions or events received includes an urgent priority transaction or event indicative of a trigger condition of a smart contract recorded in the distributed ledger or the blockchain,
   in response to the determination, aperiodically compiling, by the one or more processors, a set of autonomous vehicle-related transactions or events received since a prior compilation period into a block of transactions or events, wherein the urgent priority transaction or event is included in the block;
   distributing, by the one or more processors, the block of autonomous vehicle-related transactions or events to a plurality of validation entities or nodes within a communication network to form a consensus on whether or not to update the distributed ledger or the blockchain;
   when a consensus is formed, routing, by the one or more processors, the urgent priority transaction to the smart contract; and
   automatically executing, by the one or more processors, an action the smart contract directs should be performed in response to the trigger condition, the action determined based upon a decision condition included in another transaction or event routed to the smart contract.

2. The computer-implemented method of claim 1, wherein:
   the trigger condition for the smart contract is a particular autonomous vehicle incurring liability or being involved in a collision; and
   the urgent transaction or event indicates that the particular autonomous vehicle incurred liability or was involved in a collision.

3. The computer-implemented method of claim 2, wherein:
   the decision condition for the particular smart contract is a control state of the particular autonomous vehicle; and
   the other transaction or event indicates whether the particular autonomous vehicle was being autonomously, remotely, or manually operated.

4. The computer-implemented method of claim 3, wherein automatically executing the action comprises:
   assigning, by the one or more processors, the liability to (i) an insurer associated with an operator of the particular autonomous vehicle when the other transaction or event indicates the particular autonomous vehicle was being manually operated, and (ii) a manufacturer of the particular autonomous vehicle when the other transaction or event indicates the particular autonomous vehicle was being autonomously operated.

5. The computer-implemented method of claim 2, automatically executing the action comprises:
   transmitting, by the one or more processors, at least one of a tow request to a towing service, a police report to a law enforcement entity, or a subrogation request to an insurer of another autonomous vehicle.

6. The computer-implemented method of claim 2, wherein:
   the decision condition for the particular smart contract is a distance traversed by the particular autonomous vehicle; and
   the particular transaction indicates the distance that the particular autonomous vehicle has traversed during a trip.

7. The computer-implemented method of claim 6, wherein automatically executing the action comprises:
   assigning, by the one or more processors, liability to (i) an operator of the particular autonomous vehicle when the distance traversed by the particular autonomous vehicle exceeds a maximum trip length indicated in the particular smart contract, or (ii) an insurer associated with the operator of the particular autonomous vehicle when the distance traversed by the particular autonomous vehicle does not exceed the maximum trip length indicated in the particular smart contract.

8. The computer-implemented method of claim 1, wherein distributing the block to the plurality of validation entities further comprises:
   distributing, by the one or more processors, the block to a portion of the plurality of autonomous vehicles.

9. The computer-implemented method of claim 1, wherein the autonomous vehicle-related transactions or events recorded are related to at least one of the following autonomous vehicle systems, features, or technologies:
   driver alertness monitoring;
   driver responsiveness monitoring;
   pedestrian detection;
   artificial intelligence;
   a back-up system;
   a navigation system;
   a positioning system;

a security system;
an anti-hacking measure;
a theft prevention system; or
remote vehicle location determination.

10. A computer system configured to maintain a distributed ledger or blockchain of transactions or events pertaining to autonomous vehicles, wherein the distributed ledger or the blockchain is configured to periodically compile blocks of transactions, the system comprising one or more processors, transceivers, and/or sensors configured to:
receive one or more autonomous vehicle-related transactions or events from one or more autonomous vehicles via a mesh network formed of multiple autonomous vehicles;
determine that the one or more transactions received includes an urgent priority transaction or event indicative of a trigger condition of a smart contract recorded in the distributed ledger or the blockchain;
in response to the determination, aperiodically compiling, by the one or more processors, a set of autonomous vehicle-related transactions or events received since a prior compilation period into a block of transactions or events, wherein the urgent priority transaction or event is included in the block;
distribute the block of autonomous vehicle-related transactions or events to a plurality of validation entities or nodes within a communication network to form a consensus on whether or not to update the distributed ledger or the blockchain; and
when a consensus is formed, route the urgent priority transaction to the smart contract; and
automatically execute an action the smart contract directs should be performed in response to the trigger condition, the action determined based upon a decision condition included in another transaction or event routed to the smart contract.

11. The computer system of claim 10, wherein:
the trigger condition for the particular smart contract is a particular autonomous vehicle incurring liability or being involved in a vehicle collision; and
the particular transaction or event indicates that the particular autonomous vehicle incurred liability or was involved in a vehicle collision.

12. The computer system of claim 11, wherein:
the decision condition for the particular smart contract is a control state of the particular autonomous vehicle; and
the other transaction or event indicates whether the particular autonomous vehicle was being autonomously, remotely, or manually operated.

13. The computer system of claim 12, wherein the system if further configured to:
assign the liability to (i) an insurer associated with an operator of the particular autonomous vehicle when the other transaction or event indicates the particular autonomous vehicle was being manually operated, and (ii) a manufacturer of the particular autonomous vehicle when the other transaction or event indicates the particular autonomous vehicle was being autonomously operated.

14. The computer system of claim 11, the system further configured to:
transmit at least one a tow request to a towing service, a police report to a law enforcement entity, or a subrogation request to an insurer of another autonomous vehicle.

15. The computer system of claim 14, wherein:
the decision condition for the particular smart contract is a distance traversed by the particular autonomous vehicle; and
the particular transaction indicates the distance that the particular autonomous vehicle has traversed during a trip.

16. The computer system of claim 15, wherein the system is further configured to:
assign liability to (i) an operator of the particular autonomous vehicle when the distance traversed by the particular autonomous vehicle exceeds a maximum trip length indicated in the particular smart contract, or (ii) an insurer associated with the operator of the particular autonomous vehicle when the distance traversed by the particular autonomous vehicle does not exceed the maximum trip length indicated in the particular smart contract.

17. The computer system of claim 10, wherein the system is further configured to:
distribute the block to a portion of the plurality of autonomous vehicles.

18. The computer system of claim 10, wherein the autonomous vehicle-related transactions or events recorded are related to at least one of the following autonomous vehicle systems, features, or technologies:
driver alertness monitoring;
driver responsiveness monitoring;
pedestrian detection;
artificial intelligence;
a back-up system;
a navigation system;
a positioning system;
a security system;
an anti-hacking measure;
a theft prevention system; or
remote vehicle location determination.

* * * * *